(12) United States Patent
Degen et al.

(10) Patent No.: US 8,412,633 B2
(45) Date of Patent: Apr. 2, 2013

(54) MONEY TRANSFER EVALUATION SYSTEMS AND METHODS

(75) Inventors: Robert Degen, Marietta, GA (US); Duane Ritter, Marietta, GA (US); Brian Prendergast, Loganville, GA (US); David Wittman, Monument, CO (US)

(73) Assignee: The Western Union Company, Englewood, CO (US)

( * ) Notice: Subject to any disclaimer, the term of this patent is extended or adjusted under 35 U.S.C. 154(b) by 2571 days.

(21) Appl. No.: 10/091,000

(22) Filed: Mar. 4, 2002

(65) Prior Publication Data

US 2003/0167237 A1   Sep. 4, 2003

(51) Int. Cl.
*G06Q 40/00* (2006.01)
(52) U.S. Cl. ............... 705/50; 705/1.1; 705/44; 705/64
(58) Field of Classification Search .............. 705/17, 705/39, 4, 65–79, 50–59; 380/23–25; 235/375–380; 379/114.14, 127.02, 145; 455/410
See application file for complete search history.

(56) References Cited

U.S. PATENT DOCUMENTS

| 5,949,044 | A | * | 9/1999 | Walker et al. | 705/64 |
| 5,963,647 | A | * | 10/1999 | Downing et al. | 705/39 |
| 6,095,413 | A | * | 8/2000 | Tetro et al. | 705/44 |
| 6,205,436 | B1 | | 3/2001 | Rosen | |
| 6,254,000 | B1 | | 7/2001 | Degen et al. | |
| 6,487,542 | B2 | | 11/2002 | Ebrata et al. | |
| 6,526,389 | B1 | * | 2/2003 | Murad et al. | 705/10 |
| 6,678,666 | B1 | * | 1/2004 | Boulware | 705/66 |
| 6,736,314 | B2 | * | 5/2004 | Cooper et al. | 235/380 |
| 2003/0135457 | A1 | * | 7/2003 | Stewart et al. | 705/39 |

OTHER PUBLICATIONS

Degen, et al. "System and Method for Detecting Fraudulent Calls",U.S. Appl. No. 09/948,729, filed Sep. 7, 2001.
Degen, et al. "Scoring Methodology for Purchasing Card Fraud Detection". U.S. Appl. No. 09/467,621, filed Dec. 20, 1999.

* cited by examiner

*Primary Examiner* — Calvin Loyd Hewitt, II
*Assistant Examiner* — Cristina Owen Sherr
(74) *Attorney, Agent, or Firm* — Kilpatrick Townsend & Stockton LLP

(57) ABSTRACT

Systems and methods for evaluating electronic value transfers. Various of the methods include receiving money transfer requests, electronically storing records of the money transfer requests, and performing an analysis of the records. The analysis of the records can indicate that two or more of the records are related. The related records are associated with a reference designator that is used to search money transfer records and identify suspect activity. The systems can include a fraud processing system associated with a money transfer system.

23 Claims, 22 Drawing Sheets

| | DATA | RECORD 1 | RECORD 2 | RECORD 3 | RECORD 4 | RECORD 5 | RECORD 6 |
|---|---|---|---|---|---|---|---|
| 301 | sNameLast | Nelson | Johnson | Nelson | Smart | Nelsen | Nelson |
| 303 | sNameMiddle | M. | Sam | Bertha | | Mark | |
| 307 | sNameFirst | Jack | Bob | Sally | Edna | Jack | Jack |
| 309 | sPhone | 1111111111 | 1111111111 | 2222222222 | 3333333333 | 1111199999 | 1111188888 |
| 311 | sAddress | 1411 XYZ Lane | 911 PDQ Lane | 345 GQ Lane | 234 Washington | 348 Cherry St. | 987 Villa Row |
| 313 | sAgentType | CS | CS | CS | CS | PC | PC |
| 317 | sAgentNumber | 234567 | 234569 | 876512 | 987651 | 123456 | 654321 |
| 319 | sDate | 01/18/2002 | 01/18/2002 | 01/18/2002 | 01/19/2002 | 01/18/2002 | 01/18/2002 |
| 321 | sAmountIn | 4999 | 4999 | 765 | 3999 | 1000 | 100 |
| 323 | sValueTypeIn | Dollars | Dollars | Dollars | Dollars | Dollars | Dollars |
| 327 | TransactionCost | 20 | 20 | 20 | 20 | 20 | 20 |
| 329 | rNameLast | Smart | Smart | Character | Smith | Fix | Rose |
| 331 | rNameMiddle | P. | | | B. | | |
| 333 | rNameFirst | Edna | Edna | Bert | John | Needmy | Kevin |
| 337 | rPhone | 3333333333 | 3333333333 | 7865786578 | 1414141414 | 6543897000 | 546784444 |
| 339 | rAddress | 1567 Jackson St. | 1567 Jackson St. | 1 Sesame St. | 1212 Middle East | 34 Badpart St. | 56 Greenwich |
| 341 | rAgentType | CS | CS | ATM | BANK | CS | CS |
| 343 | rAgentNumber | 987651 | 987652 | 900000 | 765410 | 154300 | 432890 |
| 347 | rDate | 1/19/2002 | 1/19/2002 | 1/19/2002 | 1/21/2002 | 1/19/2002 | 1/19/2002 |
| 349 | rAmountOut | 4999 | 4999 | 765 | 14986 | 1000 | 100 |
| 351 | rValueTypeOut | Dollars | Dollars | Dollars | SA Riyals | Dollars | Dollars |

FIG. 3a

| | RECORD 7 | RECORD 8 | RECORD 9 | RECORD 10 |
|---|---|---|---|---|
| 301 | Smart | Jones | Jones | Nielson |
| 303 | | Larry | Larry | Karrie |
| 307 | Betty | Ed | Edward | Jackson |
| 309 | 3333333333 | 5555555554 | 6666666666 | 1111188888 |
| 311 | 5251 Estes Wy. | 124 Illinois Ave. | 3641 Frederick St. | 867 Indiana Ave. |
| 313 | Kiosk | CS | ATM | Kiosk |
| 317 | 908756 | 765432 | 876543 | 645867 |
| 319 | 01/19/2002 | 01/18/2002 | 01/21/2002 | 01/18/2002 |
| 321 | 4999 | 456 | 2500 | 500 |
| 323 | Dollars | Dollars | Dollars | Dollars |
| 327 | 20 | 20 | 20 | 20 |
| 329 | Smith | Corporation | Corporation | Smith |
| 331 | B. | | | B. |
| 333 | John | Sales | Sales | John |
| 337 | 5656565656 | 76543210 | 76543210 | 5678123465 |
| 339 | 1212 Middle East | 50 NY St. | 50 NY St. | 1212 Middle East |
| 341 | BANK | MT | MT | BANK |
| 343 | 765410 | 765432 | 876543 | 765410 |
| 347 | 1/21/2002 | 1/18/2002 | 1/21/2002 | 1/21/2002 |
| 349 | 18746 | 456 | 2500 | 1775 |
| 351 | SA Riyals | Dollars | Dollars | SA Riyals |

FIG. 3b

| | 340 | 345 | 350 | 355 |
|---|---|---|---|---|
| | RECORD 7 | RECORD 8 | RECORD 9 | RECORD 10 — 301 |
| | Smart | Jones | Jones | Nielson — 307 |
| | Betty | Ed | Edward | Jackson — 309 |
| | 3333333333 | 5555555554 | 6666666666 | 1111188888 |
| | | | | — 317 |
| | 908756 | 765432 | 876543 | 645867 — 319 |
| | 01/19/2002 | 01/18/2002 | 01/21/2002 | 01/18/2002 |
| | | | | |
| | Smith | Corporation | Corporation | Smith — 329 |
| | John | Sales | Sales | John — 333 |
| | 5656565656 | 76543210 | 76543210 | 54678123465 — 337 |
| | 765410 | 765432 | 876543 | 765410 — 343 |
| | | | | |
| | | | | |

| Reference Designator Number | NameLast | NameFirst | Phone | MasterLocationIn | MasterLocationOut | TimeStamp |
|---|---|---|---|---|---|---|
| 000000001 | Alexander | John | 7680000000 | 84604 | 14850 | 1/15/2002 |
| | Jones | Edward | 5555555555 | | | |

FIG. 6

| Reference Designator Number | NameLast | NameFirst | Phone | MasterLocationIn | MasterLocationOut | TimeStamp |
|---|---|---|---|---|---|---|
| 000000001 | Alexander | John | 5555555555 | 84604 | 14850 | 1/15/2002 |
| | Jones | Edward | | | | |

FIG. 8a — Table 500c

| Reference Designator Number | NameLast | NameFirst | Phone | MasterLocationIn | MasterLocationOut | TimeStamp |
|---|---|---|---|---|---|---|
| 000000001 | Alexander (R0)<br>Jones (R0) | John (R0)<br>Edward (R0) | 7680000000 (R0)<br>5555555555 (R0) | 84604 (R0) | 14850 (R0) | 01/15/2002 |
| 000000002 | Nelsen (R1)<br>Smart (R1) | Jack (R1)<br>Edna (R1) | 1111111111 (R1)<br>3333333333 (R1) | 76543 (R1) | 89004 (R1) | 01/18/2002 |

FIG. 8b — Table 500d

| Reference Designator Number | NameLast | NameFirst | Phone | MasterLocationIn | MasterLocationOut | TimeStamp |
|---|---|---|---|---|---|---|
| 000000001 | Alexander (R0)<br>Jones (R0) | John (R0)<br>Edward (R0) | 7680000000 (R0)<br>5555555555 (R0) | 84604 (R0) | 14850 (R0) | 01/15/2002 |
| 000000002 | Nelsen (R1)<br>Smart (R1, R2)<br>Johnson (R2) | Jack (R1)<br>Edna (R1, R2)<br>Bob (R2) | 1111111111 (R1,R2)<br>3333333333 (R1) | 76543 (R1, R2) | 89004 (R1, R2) | 01/18/2002 |

500e

| Reference Designator Number | NameLast | NameFirst | Phone | MasterLocationIn | MasterLocationOut | TimeStamp |
|---|---|---|---|---|---|---|
| 000000001 | Alexander (R0) Jones (R0) | John (R0) Edward (R0) | 7680000000 (R0) 5555555555 (R0) | 84604 (R0) | 14850 (R0) | 01/15/2002 |
| 000000002 | Nelsen (R1) Smart (R1, R2) Johnson (R2) | Jack (R1) Edna (R1, R2) Bob (R2) | 1111111111 (R1,R2) 3333333333 (R1) | 76543 (R1, R2) | 89004 (R1, R2) | 01/18/2002 |
| 000000003 | Nelson (R3) Character (R3) | Sally (R3) Bert (R3) | 2222222222 (R3) 7865786578 (R3) | 865434 (R3) | 000102 (R3) | 01/18/2002 |

555a → row 1; 810b → row 2; 820 → row 3

| Reference Designator Number | NameLast | NameFirst | Phone | MasterLocationIn | MasterLocationOut | TimeStamp |
|---|---|---|---|---|---|---|
| 000000001 | Alexander (R0) Jones (R0) | John (R0) Edward (R0) | 7680000000 (R0) 5555555555 (R0) | 84604 (R0) | 14850 (R0) | 01/15/2002 |
| 000000002 | Nelsen (R1) Smart (R1) Johnson (R2) Smith (R4) | Jack (R1) Edna (R1) Bob (R2) John (R4) | 1111111111 (R1,R2) 3333333333 (R1,R4) 1414141414 (R4) | 76543 (R1, R2) 89004 (R4) | 89004 (R1, R2) SA (R4) | 01/15/2002 01/19/2002 |
| 000000003 | Nelson (R3) Character (R3) | Sally (R3) Bert (R3) | 2222222222 (R3) 7865786578 (R3) | 865434 (R3) | 000102 (R3) | 01/18/2002 |

555a → row 1; 810c → row 2; 820 → row 3

FIG. 8d

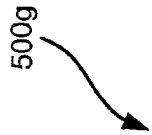
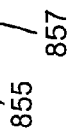

| Reference Designator Number | NameLast | NameFirst | Phone | MasterLocationIn | MasterLocationOut | TimeStamp |
|---|---|---|---|---|---|---|
| 000000001 | Alexander (R0)<br>Jones (R0) | John (R0)<br>Edward (R0) | 7680000000 (R0)<br>5555555555 (R0) | 84604 (R0) | 14850 (R0) | 01/15/2002 |
| 000000002 | Nelson (R1)<br>Nelsen (R5)<br>Smart (R1)<br>Johnson (R2)<br>Smith (R4)<br>Fix (R5) | Jack (R1,R2)<br>Edna (R1)<br>Bob (R2)<br>John (R4)<br>Needmy (R5) | 11111111111 (R1,R2)<br>33333333333 (R1,R4)<br>1414141414 (R4)<br>1111999999 (R5)<br>6543897000 (R5) | 76543 (R1, R2)<br>89004 (R4)<br>87600 (R5) | 89004 (R1, R2)<br>SA (R4)<br>76500 (R5) | 01/19/2002 |
| 000000003 | Nelson (R3)<br>Character (R3) | Sally (R3)<br>Bert (R3) | 2222222222 (R3)<br>7865786578 (R3) | 8865434 (R3) | 000102 (R3) | 01/18/2002 |

FIG. 8e

| Reference Designator Number | NameLast | NameFirst | Phone | MasterLocationIn | MasterLocationOut | TimeStamp |
|---|---|---|---|---|---|---|
| 000000001 | Alexander (R0) | John (R0) | 7680000000 (R0) | 84604 (R0) | 14850 (R0) | 01/15/2002 |
|  | Jones (R0) | Edward (R0) | 5555555555 (R0) |  |  |  |
| 000000002 | Nelson (R1,R6) | Jack (R1,R2,R6) | 11111111111 (R1,R2) | 76543 (R1, R2) | 89004 (R1, R2) | 01/19/2002 |
|  | Nelsen (R5) |  | 33333333333 (R1,R4) | 89004 (R4) | SA (R4) |  |
|  | Smart (R1) | Edna (R1) | 14141414141 (R4) | 87600 (R5) | 76500 (R5) |  |
|  | Johnson (R2) | Bob (R2) | 11119999999 (R5) | 78950 (R6) | 09876 (R6) |  |
|  | Smith (R4) | John (R4) | 6543897000 (R5) |  |  |  |
|  | Fix (R5) | Needmy (R5) | 11111188888 (R6) |  |  |  |
|  | Rose (R6) | Kevin (R6) | 54677844444 (R6) |  |  |  |
| 000000003 | Nelson (R3) | Sally (R3) | 2222222222 (R3) | 865434 (R3) | 000102 (R3) | 01/18/2002 |
|  | Character (R3) | Bert (R3) | 7865786578 (R3) |  |  |  |

| Reference Designator Number | NameLast | NameFirst | Phone | MasterLocationIn | MasterLocationOut | TimeStamp |
|---|---|---|---|---|---|---|
| 000000001 | Alexander (R0) | John (R0) | 7680000000 (R0) | 84604 (R0) | 14850 (R0) | 01/15/2002 |
| | Jones (R0) | Edward (R0) | 5555555555 (R0) | | | |
| 000000002 | Nelson (R1,R6) | Jack (R1,R5,R6) | 1111111111 (R1,R2) | 76543 (R1, R2) | 89004 (R1, R2) | 01/19/2002 |
| | Nelsen (R5) | | 3333333333 (R1,R4,R7) | 89004 (R4) | SA (R4) | |
| | Smart (R1) | Edna (R1) | 1414141414 (R4) | 87600 (R5) | 76500 (R5) | |
| | | Betty (R7) | 1111999999 (R5) | 78950 (R6) | 09876 (R6) | |
| | Johnson (R2) | Bob (R2) | 6543897000 (R5) | | | |
| | Smith (R4) | John (R4) | 1111188888 (R6) | | | |
| | Fix (R5) | Needmy (R5) | 5467844444 (R6) | | | |
| | Rose (R6) | Kevin (R6) | 5656565656 (R7) | | | |
| 000000003 | Nelson (R3) | Sally (R3) | 2222222222 (R3) | 865434 (R3) | 000102 (R3) | 01/18/2002 |
| | Character (R3) | Bert (R3) | 7865786578 (R3) | | | |

FIG. 8g

| Reference Designator Number | NameLast | NameFirst | Phone | MasterLocationIn | MasterLocationOut | TimeStamp |
|---|---|---|---|---|---|---|
| 000000001 | Alexander (R0)<br>Corporation (R8)<br>Jones (R0,R8) | John (R0)<br>Sales (R8)<br>Edward (R0)<br>Ed (R8) | 7680000000 (R0)<br>5555555555 (R0)<br>5555555554 (R8)<br>76543210 (R8) | 84604 (R0,R8) | 14850 (R0,R8) | 01/18/2002 |
| 000000002 | Nelson (R1,R6)<br>Nelsen (R5)<br>Smart (R1)<br>Johnson (R2)<br>Smith (R4)<br>Fix (R5)<br>Rose (R6) | Jack (R1,R5,R6)<br>Edna (R1)<br>Betty (R7)<br>Bob (R2)<br>John (R4)<br>Needmy (R5)<br>Kevin (R6) | 1111111111 (R1,R2)<br>3333333333 (R1,R4,R7)<br>1414141414 (R4)<br>1111999999 (R5)<br>6543897000 (R5)<br>1111188888 (R6)<br>5467844444 (R6)<br>5656565656 (R7) | 76543 (R1, R2)<br>89004 (R4)<br>87600 (R5)<br>78950 (R6) | 89004 (R1, R2)<br>SA (R4)<br>76500 (R5)<br>09876 (R6) | 01/19/2002 |
| 000000003 | Nelson (R3)<br>Character (R3) | Sally (R3)<br>Bert (R3) | 2222222222 (R3)<br>7865786578 (R3) | 865434 (R3) | 000102 (R3) | 01/18/2002 |

FIG. 8h

| Reference Designator Number | NameLast | NameFirst | Phone | MasterLocationIn | MasterLocationOut | TimeStamp |
|---|---|---|---|---|---|---|
| 000000001 | Alexander (R0)<br>Corporation (R8)<br>Jones (R0,R8,R9) | John (R0)<br>Sales (R8)<br>Edward (R0,R9)<br>Ed (R8) | 7680000000 (R0)<br>5555555555 (R0)<br>5555555554 (R8)<br>76543210 (R8,R9)<br>6666666666 (R9) | 84604 (R0,R8)<br>34576 (R9) | 14850 (R0,R8,R9) | 01/19/2002 |
| 000000002 | Nelson (R1,R6)<br>Nelsen (R5)<br>Smart (R1)<br>Johnson (R2)<br>Smith (R4)<br>Fix (R5)<br>Rose (R6) | Jack (R1,R5,R6)<br>Edna (R1)<br>Betty (R7)<br>Bob (R2)<br>John (R4)<br>Needmy (R5)<br>Kevin (R6) | 1111111111 (R1,R2)<br>3333333333 (R1,R4,R7)<br>1414141414 (R4)<br>1111999999 (R5)<br>6543897000 (R5)<br>1111188888 (R6)<br>5467844444 (R6)<br>5656565656 (R7) | 76543 (R1, R2)<br>89004 (R4)<br>87600 (R5)<br>78950 (R6) | 89004 (R1, R2)<br>SA (R4)<br>76500 (R5)<br>09876 (R6) | 01/19/2002 |
| 000000003 | Nelson (R3)<br>Character (R3) | Sally (R3)<br>Bert (R3) | 2222222222 (R3)<br>7865786578 (R3) | 865434 (R3) | 000102 (R3) | 01/18/2002 |

FIG. 8i

| Reference Designator Number | NameLast | NameFirst | Phone | MasterLocationIn | MasterLocationOut | TimeStamp |
|---|---|---|---|---|---|---|
| 000000001 | Alexander (R0) | John (R0) | 7680000000 (R0) | 84604 (R0,R8) | 14850 (R0,R8, R9) | 01/19/2002 |
|  | Corporation (R8) | Sales (R8) | 5555555555 (R0) | 34576 (R9) |  |  |
|  | Jones (R0,R8,R9) | Edward (R0,R9) | 5555555554 (R8) |  |  |  |
|  |  | Ed (R8) | 76543210 (R8,R9) |  |  |  |
|  |  |  | 6666666666 (R9) |  |  |  |
| 000000002 | Nelson (R1,R6) | Jack (R1,R5,R6) | 11111111111 (R1,R2) | 76543 (R1, R2) | 89004 (R1, R2) | 01/19/2002 |
|  | Nelsen (R5) |  | 3333333333 (R1,R4,R7) | 89004 (R4) | SA (R4, R7, R10) |  |
|  | Smart (R1) | Edna (R1) | 1414141414 (R4) | 87600 (R5) | 76500 (R5) |  |
|  |  | Betty (R7) | 1111999999 (R5) | 78950 (R6,R10) | 09876 (R6) |  |
|  | Johnson (R2) | Bob (R2) | 6543897000 (R5) |  |  |  |
|  | Smith (R4) | John (R4) | 1111188888 (R6,R10) |  |  |  |
|  | Fix (R5) | Needmy (R5) | 5467844444 (R6) |  |  |  |
|  | Rose (R6) | Kevin (R6) | 5656565656 (R7) |  |  |  |
|  | Nielson (R10) | Jackson (R10) | 5678123465 (R10) |  |  |  |
| 000000003 | Nelson (R3) | Sally (R3) | 2222222222 (R3) | 865434 (R3) | 000102 (R3) | 01/18/2002 |
|  | Character (R3) | Bert (R3) | 7857786578 (R3) |  |  |  |

FIG. 8j

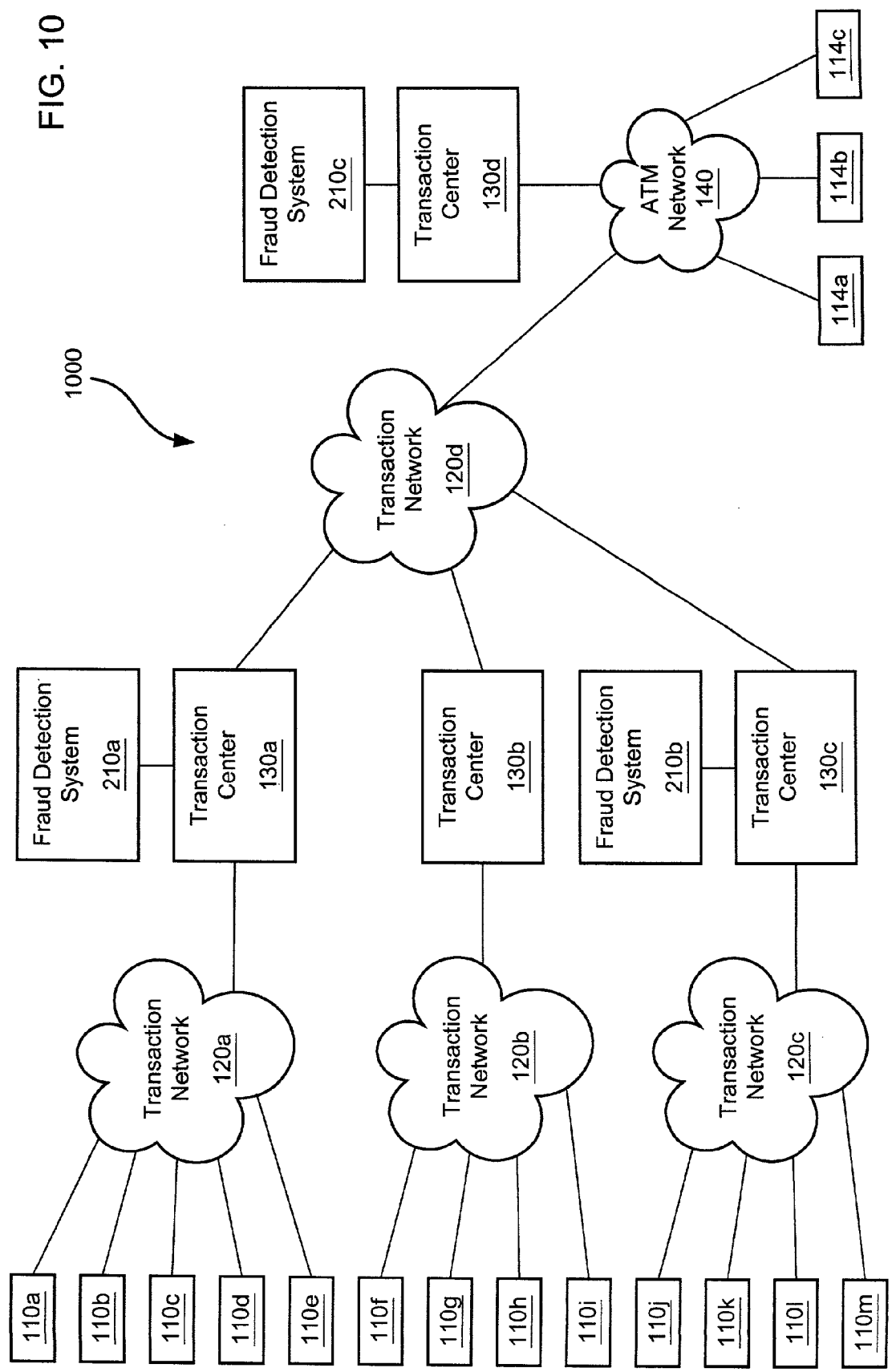

MONEY TRANSFER EVALUATION SYSTEMS AND METHODS

BACKGROUND OF THE INVENTION

This invention is related to the field of electronic financial transaction, and in particular to electronic value or money transfers. More specifically, the invention is related to systems and methods to evaluate such transactions for suspicious activities.

Electronic transactions play an important role in today's economy. Such transactions may include, for example, ACH transactions, credit card transactions, wire transfers, bank account transfers, and the like. Such transactions may be performed in a variety of ways, including, for example, by using the Internet, by using a phone to contact a service representative or an IVR system, by an in-person visit to a financial institution or money transfer location, and the like. For example, to perform a money transfer transaction a sender may visit a money transfer location and fill out a money transfer application. This application may request the sender's name, the name of the recipient and the amount of money to be transferred. This information is transmitted to a central database, and the money to be transferred is collected from the recipient. When ready to receive the money, the recipient may proceed to a pick-up location and provide the proper identification. The database is accessed to confirm the recipient and the determine the amount of money to be paid to the recipient. After payment, the date and time of payment may also be transmitted to the database.

Unfortunately, it has been reported that some have attempted to abuse such money transfer systems including those associated with organized crime, drug dealers, terrorist organizations and the like. Various procedures exist to curb such abuses. For example, the United States' government has passed laws that encourage reporting of certain suspicious monetary transfer activities. See e.g., 18 U.S.C. §1956-57. However, these laws include specific reporting requirements that are well known by criminal elements, and thus easily avoided by manipulating money transfer activities to avoid detection. Recent events and the increased need for public safety have suggested a need to implement heightened monitoring of suspicious activities involving electronic financial transactions.

Hence, among other things, this invention is related to ways to monitor and evaluate transfers for value and other financial transactions in an attempt to detect potentially suspicious activities.

BRIEF SUMMARY OF THE INVENTION

The present invention includes a variety of embodiments of both systems and methods for evaluating value transfers for suspect activities, such as terrorist activities, money laundering, and the like. An embodiment of a system in accordance with the present invention includes a money transfer system associated with a fraud processing server. The fraud processing server is capable of accessing money transfer records associated with the money transfer system and evaluating the records for any suspect money transfers.

In some embodiments, the fraud processing server is a fraud processing computer that is associated with a computer readable medium. The computer readable medium includes computer instructions executable by the fraud processing computer to access a money transfer record; provide a reference designator associated with one or more of a sender identification and a receiver identification from a second money transfer record; and compare the money transfer record to the reference designator. In some instances, the comparison indicates that the money transfer record is not related to the reference designator. In such instances, a second reference designator is created and associated with the money transfer record.

Various embodiments of methods in accordance with the present invention are also provided. One embodiment of a method for evaluating value transfers includes receiving money transfer requests, electronically storing records of the money transfer requests, and performing an analysis of the records. In some instances, the analysis indicates two or more of the records are related. A reference designator is created and associated with the related records. The reference designator can be used to search various money transfer records according to a specified criteria to determine if any of the money transfer requests associated with the reference designator are suspect money transfer requests. Suspect money transfer requests are flagged.

The method can include identifying a number of different suspicious money transfer activities. For example, the method can be used to identify: (a) a transfer from a first sender to a second sender followed within a specified period by a transfer from the second sender to the first sender; (b) a group of transfers from a sender to a group of receivers, wherein the aggregate amount of the group of transfers exceeds a specified level; (c) one or more transfers from a sender to a receiver, wherein the aggregate amount of the one or more transfers exceeds a specified level; (d) a group of transfers from a group of senders to a receiver, wherein the aggregate amount of the group of transfers exceeds a specified level; (e) two transfers from a first sender to a second sender that are followed within a specified period by corresponding transfers from the second sender to a receiver; (f) two or more transfers from a sender to a receiver, wherein the two or more transfers are initiated from two or more distinct locations within a region; and/or (g) two or more transfers from a sender to a receiver, wherein the two or more transfers are received at two or more distinct locations within a region.

Other embodiments include a method for evaluating electronic value transfers where the method includes accessing a money transfer record, assigning a master location to the money transfer record, and comparing the money transfer record to a reference designator using a specified criteria. In some instances, one or more fields of the reference designator or the money transfer record indicate a relationship between the reference designator and the money transfer record. In such instances, the money transfer record and the reference designator are associated.

Yet other embodiments of the present invention include a method for iteratively compiling suspect money transfer activities from money transfer records. The method includes accessing a first money transfer record; providing a first reference designator; and comparing the first money transfer record to the first reference designator using a specified criteria. In some instances, the comparison indicates the first money transfer record is not related to the first reference designator. In such instances, a second reference designator is created and associated with the first money transfer record.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIGS. 3a-3b illustrate an exemplary record of money transfers effectuated using the money transfer system of FIG. 1, where FIG. 3a is the first portion of the record and FIG. 3b is the second portion of the record;

FIGS. 4a-4b illustrate the record of FIG. 3 that is parsed and stripped in accordance with various embodiments of the present invention, where FIG. 4a is the first portion of the record and FIG. 4b is the second portion of the record;

FIGS. 5 and 6 illustrate reference designator lists in accordance with embodiments of the present invention;

FIGS. 8a-8j illustrate the reference designator list of FIG. 5 augmented using data from the record of FIG. 4 in accordance with methods illustrated in FIGS. 7a-7c;

FIG. 10 illustrates a plurality of fraud watch systems associated with a money transfer system in accordance with yet another embodiment of the present invention.

DETAILED DESCRIPTION OF THE INVENTION

Figure 1:
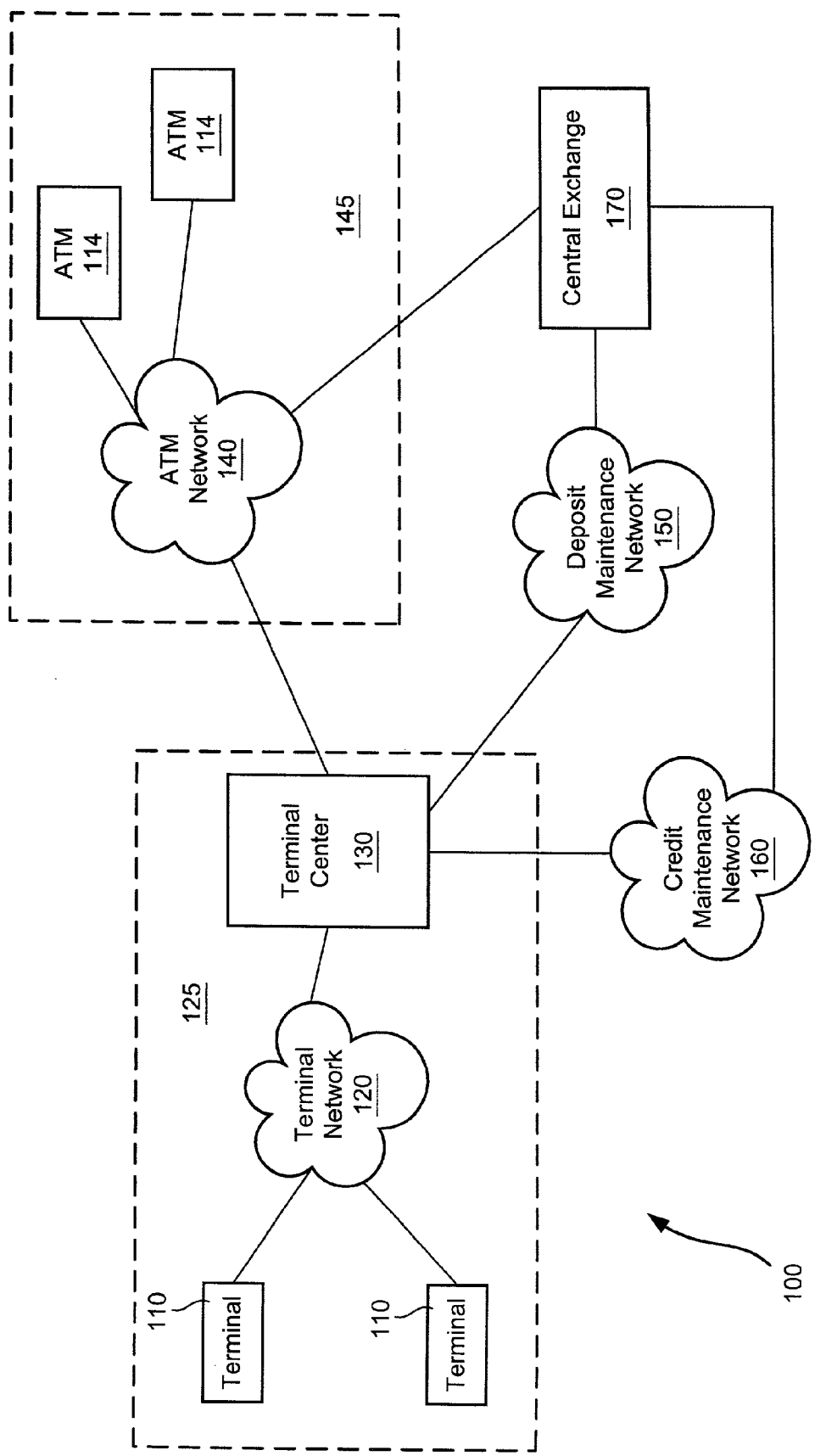
FIG. 1 illustrates a money transfer system capable of evaluation using systems and methods in accordance with the present invention.

This invention relates to methods and systems for evaluating electronic value transfers for suspect activities, such as terrorist activities, money laundering, and the like. The electronic transfers that may be evaluated may take a variety of forms. For example, such electronic transfers may take the form of traditional money transfers where the money to be transferred is presented at a first money transfer location and is electronically "wired" to a second money transfer location where the transferred money is paid to the recipient. Such money transfer services are provided by a number of companies, such as Western Union. Other types of electronic transfers may include wire transfers from one financial institution to one or more other financial institutions, electronic ACH transfers, electronic transfers over networks, such as the Internet (including those described in copending U.S. patent application Ser. No. 10/040,568, entitled "Systems and Methods of Introducing and Receiving Information Across a Computer Network" and filed Jan. 4, 2002, which is incorporated herein by reference for all purposes; U.S. patent application Ser. No. 10/037,827, entitled "Methods for Receiving Electronically Transferred Funds Using an Automated Teller Machine" and filed Jan. 3, 2002, which is incorporated herein by reference for all purposes; U.S. patent application Ser. No. 09/991,497, entitled "Online Funds Transfer Method" and filed on a date prior hereto, which is incorporated herein by reference for all purposes.

Further, although the invention may find its greatest use in relation to cash transfers, the invention may be used to evaluate other types of value transfers as well. For example, the invention may be used with value transfers, such as those involving phone minutes, loyalty program points and/or awards, frequent flier miles, stored value accounts, and the like. Thus, for purposes of this document, the term money transfer is defined to include any transfer of value between entities. Such a money transfer can include a transfer of value between an entity and itself, or between an entity and one or more separate entities. For example, a money transfer can include a transfer of value between a first person and a second person, between a person and a corporation, between a first corporation and a second corporation, and/or between a corporation and itself. Such money transfers can include providing value and/or information such as, cash, checks, stored value cards, credit cards, debit cards, cash cards, a bank account number, a frequent flyer account number, a cellular telephone account number, and the like.

To monitor potentially suspicious activities, some embodiments of the invention include electronically accessible records relating to money transfers. These records are searched according to specified criteria to determine if any transactions are potentially suspect. If so, these records are flagged and may be separately stored for further evaluation. For example, in the money transfer world, certain dollar value transactions need to be reported to the U.S. Government. The historical records may be searched for dollar ranges just below this limit to determine if multiple transactions are made by the same person or received by the same person within a specified time in order to avoid being reported to the U.S. Government.

Various criteria can be defined to evaluate a money transfer system in accordance with the present invention including certain transfer amount limits, transactions between particular known entities, transactions associated with messages that are to be translated to particular languages, and/or transactions where the value converted to a particular form, such as, a particular foreign currency.

The systems and methods are capable of looking at both sides of a transaction or only the sender or receiver side. Other embodiments provide for checking a combination of transactions to detect suspicious behavior. Further, embodiments of the present invention incorporate a reference designator list useful for, among other things, searching a transaction database to identify suspicious and/or illicity transfer activity. In some embodiments, elements of the list can be purged based on either time, known information, or a combination thereof.

The systems and methods can be tailored to a particular money transfer system such that the overall impact of any monitoring on the transfer system is reduced. Thus, for example, such systems and methods can run either in real time or in a batched mode during off-peak time for the evaluated money transfer system. In some embodiments, an intelligent, iterative approach is applied to identify factors related to suspicious behavior. Such an approach can avoid a static situation that, when known to criminal elements, is easily avoided.

The invention provides and/or utilizes various equipment and techniques in relation to evaluating money transfers. The invention permits some form of value, such as money, to be received and then electronically transferred to another location where it is available for pickup or further processing in the same or an alternate form. In some embodiments, a money transfer mechanism is utilized to effectuate and/or evaluate a money transfer. FIG. 1 illustrates an exemplary money transfer system 100. While FIG. 1 illustrates an exemplary money transfer mechanism, one of ordinary skill in the art will recognize other money transfer mechanisms to which the present invention may be applied or used in conjunction with.

Referring to FIG. 1, money transfer system 100 is comprised of an interface system 125, an automatic teller system ("ATM") system 145, a deposit maintenance network 150, a credit maintenance network 160 and a central exchange 170. Interface system 125 is communicably coupled to ATM system 145 via an ATM network 140, deposit maintenance network 150 and credit maintenance network 160. In general, interface system 125 unifies a variety of transfer systems while supporting a variety of mechanisms for introducing and receiving information to and/or from money transfer system 100.

Interface system 125 comprises a transaction center 130 and one or more terminals 110 in communication via a transaction network 120. Transaction network 120 can be any communication network capable of transmitting and receiving information in relation to a transfer of value from one entity to another. For example, transaction network 120 can comprise a TCP/IP compliant virtual private network (VPN), the Internet, a local area network (LAN), a wide area network (WAN), a telephone network, a cellular telephone network, an optical network, a wireless network, or any other similar communication network. In particular embodiments, transaction network 120 provides message based communications between terminals 110 and transaction center 130.

Terminals 110 can be any terminal or location where value is accepted and/or provided in relation to money transfers across money transfer system 100. Thus, in some instances, terminal 110 is a convenience store where a clerk can receive value from a sender and initiate transfer of the value to a receiver via money transfer system 100. In such cases, the clerk can typically also provide transferred value to a receiver.

In other instances, terminal 110 is an automated system for receiving value from a sender for transfer via money transfer system 100 and/or for providing value to a receiver that was transferred via money transfer system 100. To accommodate various different payment instruments and types, terminal 110 can include a variety of interfaces. For example, terminal 110 can include a mechanism for receiving cash, credit cards, checks, debit cards, stored value cards and smart cards. Such terminals may also be used at the payout end to print a check or money order, or to credit a cash card or stored value card. Examples of such terminals are described in copending U.S. application Ser. No. 09/634,901, entitled "POINT OF SALE PAYMENT SYSTEM," filed Aug. 9, 2000 by Randy J. Templeton et al., which is a nonprovisional of U.S. Prov. Appl. No. 60/147,899, entitled "INTEGRATED POINT OF SALE DEVICE," filed Aug. 9, 1999 by Randy Templeton et al, the complete disclosures of which are herein incorporated by reference.

In yet other instances, terminal 110 is a personal computer operated by a sender of value. Such a terminal can be communicably coupled to transaction center 130 via the Internet. The terminal can further include a web browser capable of receiving commands for effectuating transfer of value via money transfer system 100.

Terminal identification information can be associated with each terminal 110. Such identification information includes, but is not limited to, a physical location, a telephone number, an agent identification number, a terminal identification number, a security alert status, an indication of the type of terminal, a serial number of a CPU, an IP address, the name of a clerk, and the like.

Using money transfer system 100, value can be transferred from any of a number of points. For example, value can be transferred from terminal 110 to itself or any other terminal 110, from any terminal 110 to a deposit account via deposit maintenance network 150 or credit maintenance network 160, from any terminal 110 to any ATM 114 via ATM network 140. Many other transfers to/from ATMs 114, deposit accounts, terminals, and/or credit accounts can be accomplished using money transfer system 100.

Figure 2:
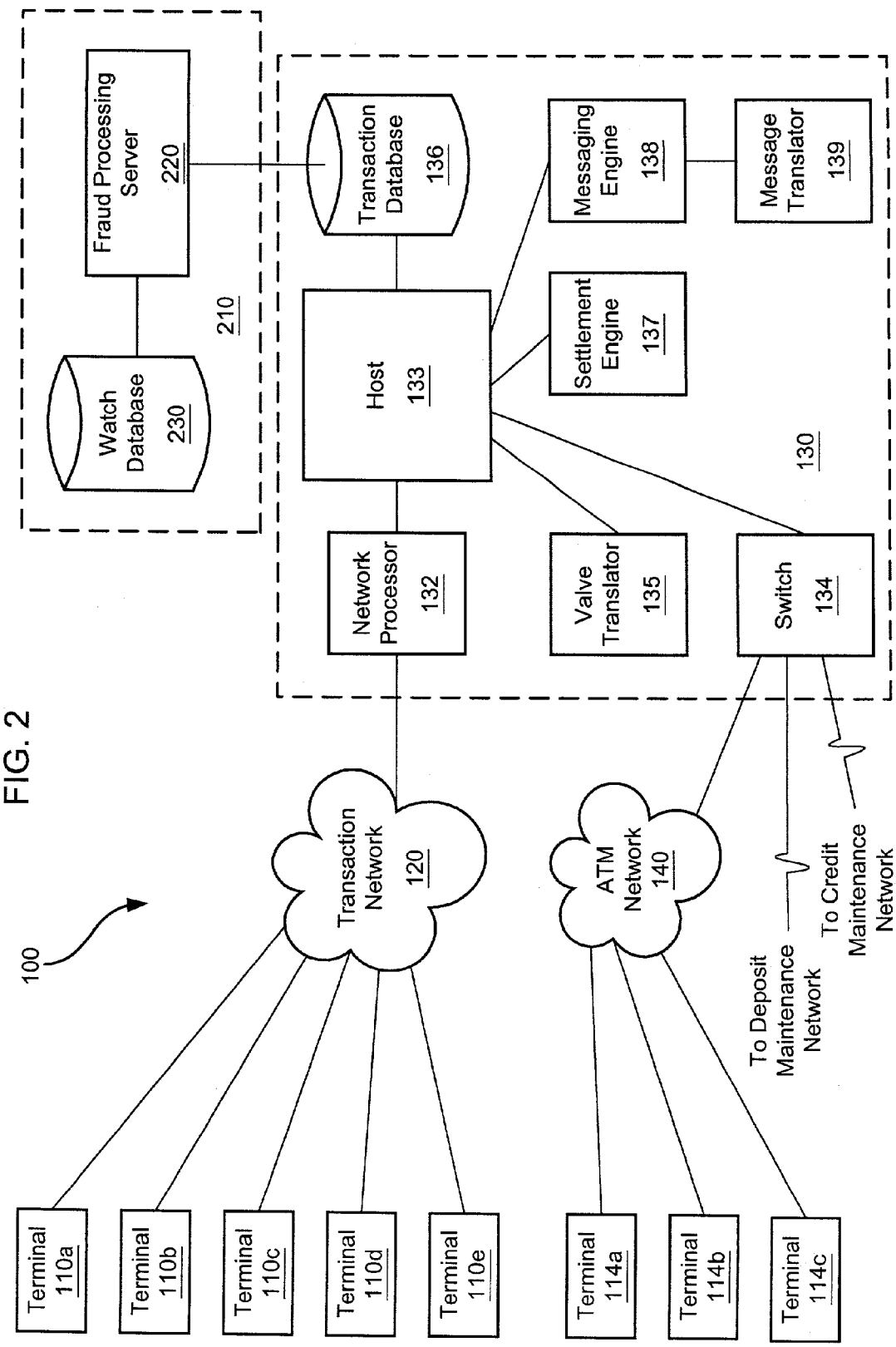
FIG. 2 illustrates a fraud watch system associated with the money transfer system of FIG. 1 in accordance with an embodiment of the present invention.

Referring to FIG. 2, in accordance with some embodiments of the present invention, a fraud watch system 210 is provided in communication with transaction center 130 of money transfer system 100. As illustrated, transaction center 130 includes a network processor 132 to process data received and transmitted via transaction network 120. Data to/from network processor 132 is available to a host 133 that may communicate with one or more of a value translator 135, a transaction database 136, a settlement engine 137 and a messaging engine 138 to perform functions associated with transferring value via money transfer system 100. In turn, messaging engine may communicate with a message translator 139. The received and/or provided by transaction center 130 may include information on the sender, information on the recipient, identification information associated with a terminal 110, the type and amount of value transferred, a desired location to transfer the value, and the like. In some cases, a value translator 135 may be used to change the type of value. For example, value translator 135 may do a foreign currency conversion, or may transfer from one type of value to another, e.g. frequent flyer miles to United States' Dollars. All information that is processed may conveniently be stored in transaction database 136.

Settlement engine 137 may be used to facilitate the crediting and debiting of various accounts during a transfer. For example, if a sender requests that funds from a credit card account be used in the transfer, settlement engine 137 is used to contact credit maintenance network 160 to charge the card and to manage the fees involved in the transaction. Such fees may be those charged by the credit organization as well as internal fees that are a part of the money transfer transaction. Settlement engine 137 may be used in a similar manner when crediting or debiting checking accounts, stored value accounts, customer loyalty points and the like.

In some cases, the sender may also wish to send a message with the value. Such a message may be a simple greeting, business or legal terms, and the like. Messaging engine 138 is employed to convert the message to the proper format depending on the type of output device that is to be used with receiving the money. For example, the output device may be a printer that physically prints the message onto some type of media. Alternatively, the message may be temporarily displayed on a display screen, such as on a kiosk, ATM machine, point of sale device, an e-mail, a web page or the like. The sender or recipient may also indicate that the message needs to be translated to a different language. In such cases, message translator 139 may be used to translate the message into the other language. This may be accomplished by simply doing a word look up for each corresponding word in the other language. More complex language translation capabilities may also be used.

Once a value transfer is properly processed, data indicating the transfer is sent by a switch 134 to the appropriate network as shown. This may be to ATM network 140, deposit maintenance network 150 and/or credit maintenance network 160 to complete the transaction.

Fraud watch system 210 includes a fraud processing server 220 and a watch database 230. Fraud watch system 210 is associated with transaction system 130 in a manner that allows for access to transaction database 136. Such association can be provided by direct wired communication between transaction database 136 and fraud processing server 220, by direct or network communication between transaction center 130 and fraud processing server 220, or by any other mechanism that provides fraud watch system 210 with access to transaction database 136. In one particular embodiment, fraud processing server 220 is communicably coupled to transaction network 120 and accesses transaction database 136 via network processor 132 and host 133. In another embodiment, fraud processing server 220 is directly coupled to host 133 and accesses transaction database 136 via host 133. It will be recognized by one of ordinary skill in the art that a number of other mechanisms exist within the scope of the present invention for providing access by fraud processing server 220 to transaction database 136.

Fraud processing server 220 can be any microprocessor based device capable of retrieving data from transaction database 136, searching and manipulating the data, maintaining a form of the data on watch database 230, and providing access to data on database 230. Such access to the data can include formatting the data and providing the data in an easily accessible form. In some embodiments, fraud processing computer is a single computer, such as a personal computer or a database server. In other embodiments, fraud processing server is a group of two or more computers. In such embodiments, fraud processing computer can include a central computer associated with one or more peripheral computers. Such peripheral computers can be personal computers or portable devices, such as lap top computers and/or personal digital assistants. In a particular embodiment, fraud processing server 220 includes a SQL server, while in other embodiments, it includes an ORACLE server.

Fraud processing server 220 includes a computer readable medium capable of maintaining instructions executable to perform the functions associated with fraud processing server 220. The computer readable medium can be any device or system capable of maintaining data in a form accessible to fraud processing computer 220. For example, the computer readable medium can be a hard disk drive either integral to fraud processing server 220 or external to the server. Alternatively, the computer readable medium can be a floppy disk or a CD-ROM apart from fraud processing server 220 and accessible by inserting into a drive (not shown) of fraud processing server 220. In yet other alternatives, the computer readable medium can be a RAM integral to fraud processing server 220 and/or a microprocessor (not shown) within the server. One of ordinary skill in the art will recognize many other possibilities for implementing the computer readable medium. For example, the computer readable medium can be a combination of the aforementioned alternatives, such as, a combination of a CD-ROM, a hard disk drive and RAM.

In some embodiments, transaction database 136 maintains a record of money transfer activities associated with money transfer system 100. An exemplary embodiment of such a record of money transfer activities 300 is illustrated in FIGS. 3a-3b. Referring to FIG. 3a, record 300 includes a schema 305 outlining the type of data maintained for each money transfer transaction. The types of data can include: a sender's last name, sNameLast 301; a sender's middle name, sNameMiddle 303; a sender's first name, sNameFirst 307, a sender's phone number, sPhone 309; a sender's address, sAddress 311; the type of agent used by a sender, sAgentType 313; the agent's identification number, sAgentNumber 317; the date a transfer was requested, sDate 319; the amount of the requested transfer, sAmountIn 321; the type of value, sValueTypeIn 323; the cost of the transfer, sTransactionCost 327; a receiver's last name, rNameLast 329; a receiver's middle name, rNameMiddle 331; a receiver's first name, rNameFirst 333, a receiver's phone number, rPhone 337; a receiver's address, rAddress 339; the type of agent used by the receiver, rAgentType 341; the agent's identification number, rAgentNumber 343; the date a transfer was received, rDate 347; the amount of the received transfer, rAmountOut 349; and the type of value received, rValueTypeOut 351. It should be recognized that, within the scope of the present invention, any number of data types can be included in record 300.

Record 300 further includes a number of specific instances 310, 315, 320, 325, 330, 335, 340, 345, 350, 355 of schema 305, as illustrated across FIGS. 3a and 3b. In this embodiment, the instances are named RECORD 1 through RECORD 10 and each includes information associated with an individual money transfer. It should be recognized that transaction database 136 can include any number of instances in accordance with the present invention. The ten instances chosen and the data associated with each of the individual records is to illustrate operation of the present invention as further discussed below. Further, it should be understood that within the scope of the present invention, record 300 can be of any size and incorporate any data types related to a money transfer system to be evaluated.

In accordance with some embodiments of the present invention, record 300 is initially parsed and stripped of data that is not relevant to evaluation of money transfers occurring on money transfer system 100. Some information that is eliminated is easily determined to lack relevance, while other information has some relevance, but is stripped from record 300 for efficiency reasons. For example, it may be determined that the cost of the money transfer, or sTransactionCost 327, is not relevant to evaluating the various money transfers. In such a case, sTransactionCost 327 can be stripped from all of the instances, or individual records within record 300. Further, it may be determined that the sender's address, sAddress 311, is relevant and useful, but not sufficiently useful to warrant utilizing the data in any substantive analysis. In such cases, sAddress 311 can be stripped from all of the instances within record 300.

Figure 4A:
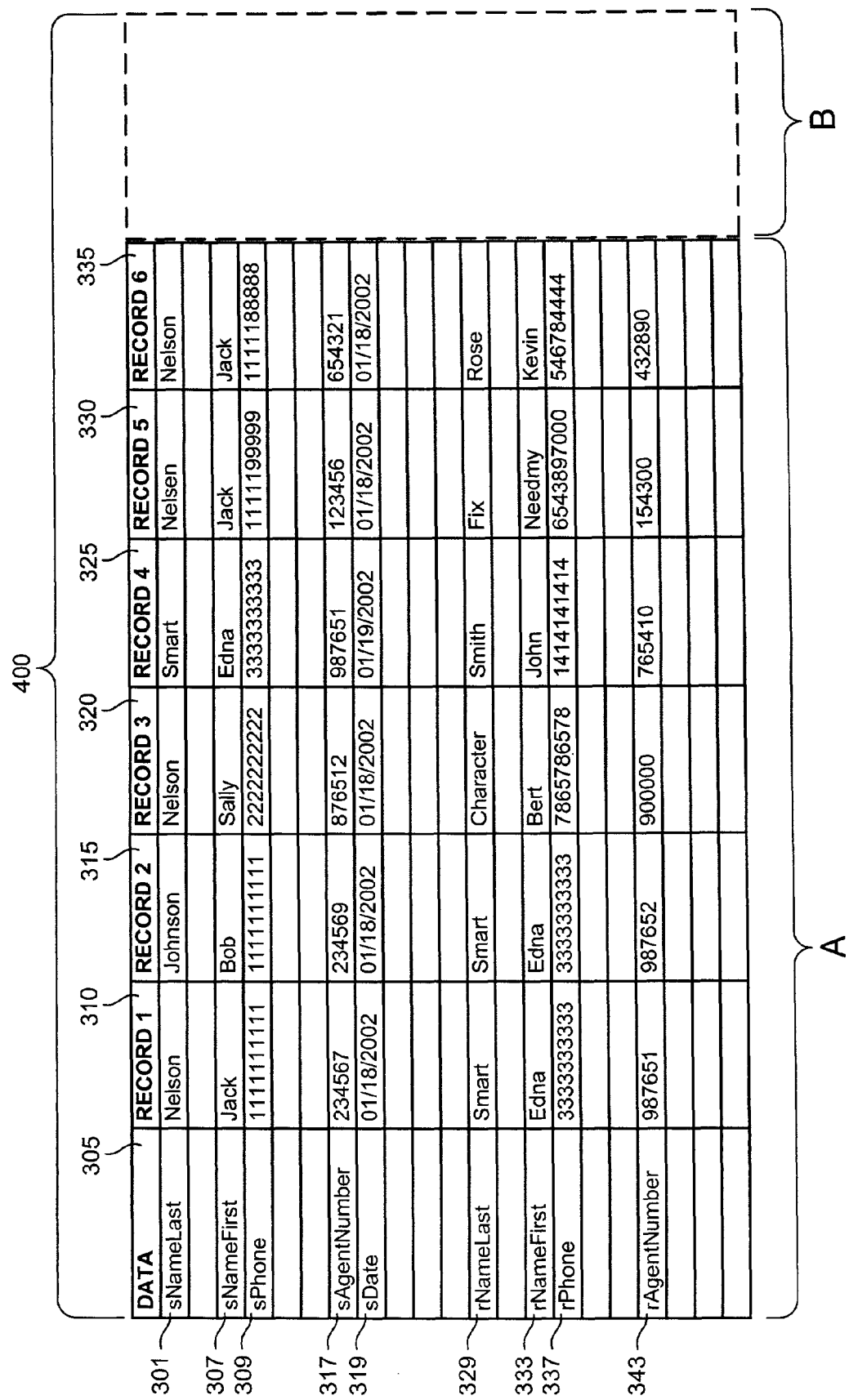

FIGS. 4a-4b illustrate a record 400 representing record 300 after it is stripped of irrelevant and less relevant data types. Referring to FIG. 4a, after the data is eliminated, record 400 includes sNameLast 301, sNameFirst 307, sPhone 309, sAgentNumber 317, sDate 319, rNameLast 329; rNameFirst 333, rPhone 337, rAgentNumber 343. Again, it should be recognized that record 400 is merely illustrative and that any data type from record 300 can be included or excluded when forming record 400.

As discussed in greater detail below, record 400 is used to construct a reference designator list. Exemplary embodiments of such a reference designator list 500 are illustrated in FIGS. 5, 6 and 8. Referring to FIG. 5, reference designator list 500a includes a single reference designator 555 including seven fields associated with the reference designator. Reference designator 555 includes a reference designator number 505, name fields 510, 515, a phone number field 520, master location fields 525, 530, and a time stamp 535.

In this embodiment, only a single money transfer is indicated. Name fields 510, 515 include the last names 560, 565 and the first names 561, 566 of both the sender and receiver involved in the money transfer. Phone number field 520 includes both the phone number of the sender and that of the receiver.

Time stamp 535 is used to indicate the staleness of information in reference designator 555. In some embodiments, time stamp 535 is the most recent sDate 319 from record 400 from the various instances clustered into reference designator 555. In other embodiments, time stamp 535 is the most recent of either sDate 319 or rDate 347. In particular embodiments, reference designators are purged from reference designator list 500 after a specified period. For example, reference designator 555 can be purged from reference designator list 500 if no activity associated with the designator occurs within thirty days, or on Feb. 14, 2002 in this instance. Purging reference designator list 500 avoids searching based on stale or inactive reference designators.

MasterLocationIn 525 indicates the general area where a the money transfer was requested by the sender and MasterLocationOut 530 indicates the general area where the money transfer was received by the receiver. In some embodiments, both MasterLocationIn 525 and MasterLocationOut 530 are created using sAgentNumber 317 and rAgentNumber 343 from record 400. For example, there may be a hundred agents within a particular region, all of which are assigned to the same master location number. Thus, where a sender requests a money transfer at an agent within the region and subsequently requests a second money transfer with another agent in the same region, the same MasterLocationIn 525 is assigned to both transfers. The assignment of MasterLocationOut 530 is similar, but used in relation to where transferred value is received.

Such an abstraction from the specific location to a master location allows for detection of an illegitimate user that hopes to avoid detection by using multiple agent locations in a common area. In some embodiments, the master location is the Zip Code of the agent location where the agent is in the United States, the first three characters of the International Zip Code of the agent location where the agent is in Canada, and the country code where the agent is in another country.

As illustrated in FIG. 6, other embodiments of reference designator list 500 incorporate different information. Thus, for example, in reference designator list 500b only the sender's telephone number 575 is included in phone field 520. This is in contrast to reference designator list 500a where both the sender's and receiver's phone numbers were included. If it is determined that the receiver's phone number is an unreliable indicator of money transfer activity, it can be excluded. For example, in some instances, a large number of the receiver's telephone numbers are fictitious, while the sender's telephone number is accurate. This often occurs because failure in a money transfer will result in calling the sender on the telephone to ask them to return and retrieve their value. In contrast, there is often no reason to telephone the receiver. Thus, an illicit transfer may include an accurate sender's telephone number to insure safe return of the transferred value, but provide a fictitious receiver's telephone number to avoid detection. Thus, as illustrated in FIG. 6, resources are not wasted monitoring the likely fictitious receiver's telephone numbers by not placing the telephone numbers in phone field 520.

As will be further evident from the discussion in relation to FIG. 7 below, reference designator 555 represents a cluster of one or more inter-related money transfers. As such, fields 510, 515, 520, 525, 530 can include all information related to the particular fields that is distilled from a group of inter-related money transfers. The inter-relationship of money transfers used to form the basis of a cluster, or reference designator, is determined based on a specified criteria. For example, a money cluster may be defined as all transfers that include the same phone number in either sPhone 309 or rPhone 337. As will be recognized, the specified criteria can include a match or even pseudo-match of any data type from one instance in record 400 with any data type from another instance of record 400. Additionally, the specified criteria can include a match or pseudo-match of a combination of data types from one instance of record 400 with any data type or combination of data types from another instance of record 400. Thus, for purposes of this document, a cluster is any association of two or more instances, or individual transfer records, based on a specified criteria.

In some embodiments of the present invention, an analysis of record 300 is occasionally performed using all data types within record 300. Such an analysis can be used to determine the relevance of data types to any evaluation of money transfer system 100. For example, a reference designator list can be developed incorporating all data types from record 300. Such an approach provides for significant clustering of transactions based on matches of various of the data types. When significant clustering is found associated with a particular data type, it can be determined if the clustering is indicative of illicit money transfer activity and, if so, the data type is identified as a reliable factor and associated with future reference designators and search criteria. Thus, some embodiments of the present invention can include iterative learning of reliable factors for identifying suspect money transfer requests. Such reliable factors can be incorporated into any search routine used to identify suspect behavior.

In some embodiments, fraud processing server 220 maintains reference designator list 500 on watch database 230, while record 300 is maintained on transaction database 136. This separation between fraud watch system 210 and money transfer system 100 provides a level of scalability and avoids unnecessary interference with money transfer system 100 by fraud watch system 210. In other embodiments, reference designator list 500 is maintained on transaction database 136 and fraud watch system is integrally associated with transaction center 130.

Figure 7A:
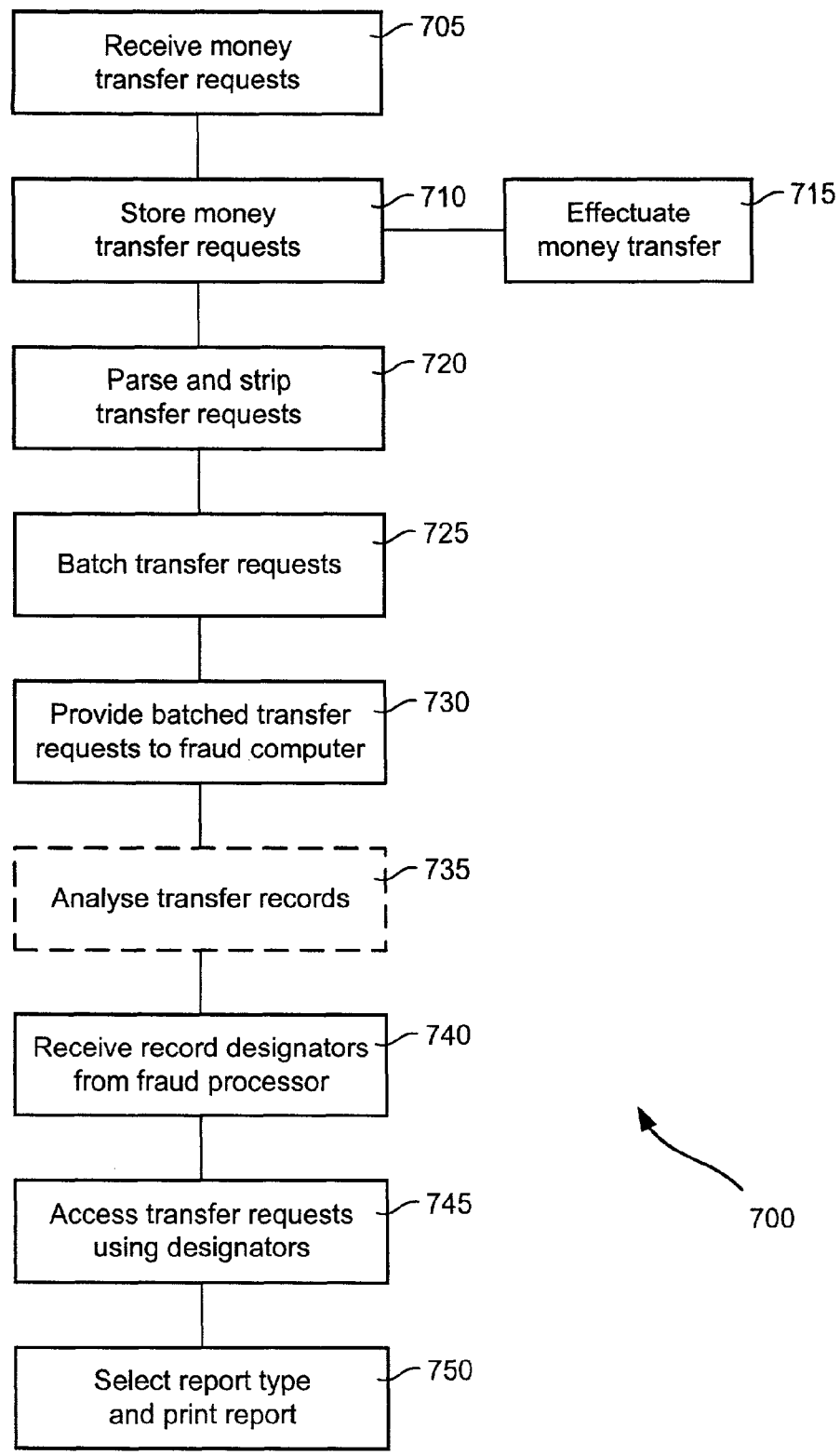
FIGS. 7a-7c illustrate processes associated with monitoring activities on a money transfer system in accordance with one embodiment of the present invention.
Figure 7B:
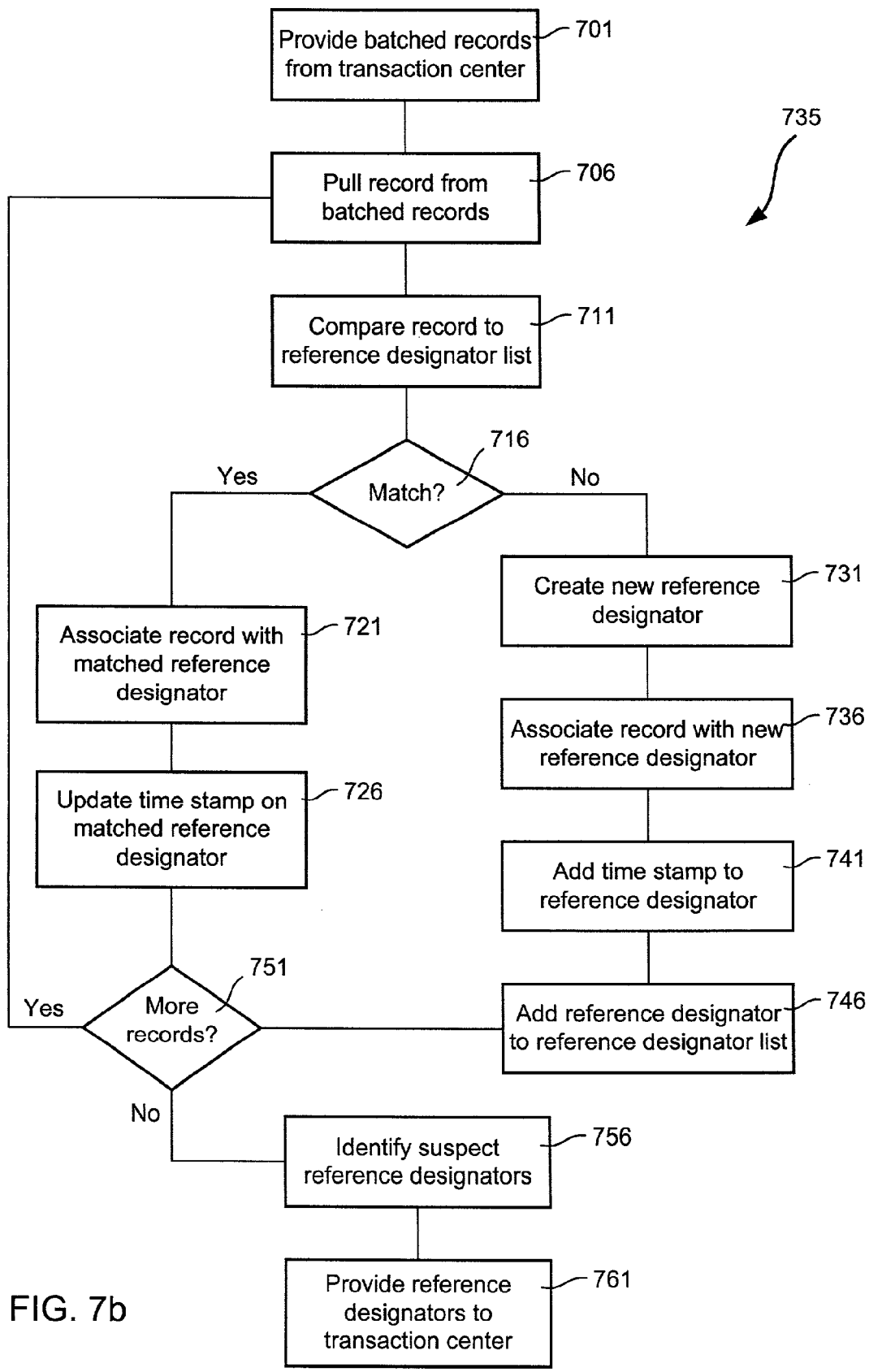
Figure 7C:
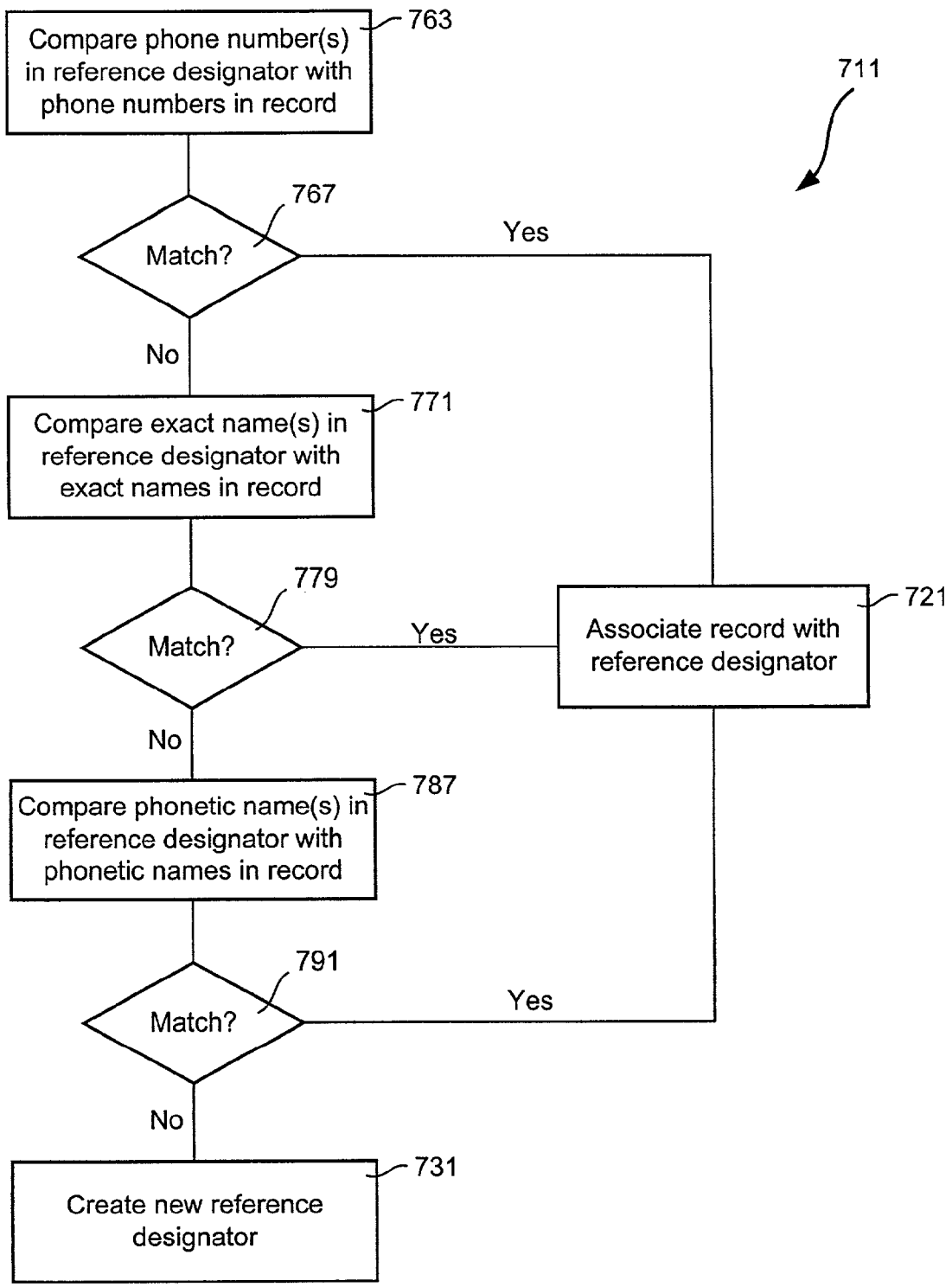

Referring to FIGS. 7a-7c, the inter-relationship and operation of fraud watch system 210 and money transfer system 100 are described. It should be recognized that the inter-relationship and operation is merely exemplary and that many other approaches are possible within the scope of the present invention. Turning to FIG. 7a, a flow diagram 700 illustrating one embodiment of the present invention is described.

As illustrated, money transfer requests are received by money transfer system 100 (block 705). Such money transfer requests are typically received when a sender enters an agent location, or terminal 110, and provides value to be transferred. As part of the transfer request, the sender provides various information about the transaction including, but not limited to, the sender's name, address, and phone number, along with the name, address, and phone number of the receiver. The agent associated with terminal 110 then enters the sending agent's type, location and identification number, as well as the receiving agent's type location and identification number. All of this information is then transmitted from terminal 110 to transaction center 130 via transaction network 120 where it is stored as an individual money transfer record on transaction database 136 (block 710). Examples of such money transfer records are instances 310, 315, 320, 325, 330, 335, 340, 345, 350, 355 of record 300. It should be noted that other methods of requesting a money transfer can be used. For example, an ATM 114 may be used or any type of terminal 110 as previously discussed can be used.

In accordance with the discussion of the operation of money transfer system 100, the received and stored money transfer request (blocks 705, 710) is effectuated (block 715). In addition, money transfer record 300 is parsed and stripped in preparation for analysis using fraud watch system 210 (block 720). As discussed in relation to FIG. 4, such parsing and stripping eliminates data from record 300 that is not beneficial to the evaluation of money transfer system 100. Thus, for example, record 300 is transformed to record 400. In some embodiments, this process is performed once per day when money transfer system 100 is experiencing its lightest load. In this way, interference with the performance of money transfer system 100 is minimized. In some embodiments, parsing and stripping of record 300 (block 720) is done each night and only transaction requests received during the preceding twenty-four hour period are included in record 300. In other embodiments, parsing and stripping of record 300 (block 720) is done each Saturday night and only transaction requests received during the preceding week are included in record 300. In yet other embodiments, parsing and stripping of record 300 (block 720) is not performed at all, but rather, record 300 is provided in its entirety for evaluation.

Once parsing and stripping (block 720) is complete, parsed and stripped record 400 is formatted for transfer (block 725) and transferred to fraud watch system 210 (block 730). Transferred record 400 is analyzed by fraud watch system 210 (block 735). Detail of such analysis is provided below in relation to FIGS. 7b and 7c.

Referring to FIG. 7b, a flow diagram of block 735 is provided to illustrate an operation of fraud processor 210. Fraud processor 210 receives record 400 from money transfer system 100 (block 701), and accesses the first transaction record, or record 310, therefrom (block 706). Record 310 is compared to reference designator list 500 to determine if record 310 is related to any previously identified money transfer requests or clusters of money transfer requests. Various comparison mechanisms are possible in accordance with the present invention.

For example, the comparison can be of sPhone 309 with each entry within phone field 520 of each reference designator within reference designator list 500. In embodiments where reference designator list 500 includes both sender and receiver phone numbers in phone field 520, the comparison involves checking both the sender and receiver sides of the transaction. Alternatively, where reference designator list 500 includes only numbers associated with senders within phone field 520, comparison check only one side, the sender's side, of each record. In yet another alternative, both sPhone 309 and rPhone 337 are compared to numbers maintained within phone field 520 of reference designator list 500. In such embodiments, both the sender side and the receiver side of each transaction is evaluated.

In other embodiments, the sender's and receiver's names are compared to names associated with reference designators within name fields 510, 515 of reference designator list 500. Such comparison can include a comparison of last names followed by first names. In particular embodiments, such a name comparison is a phonetic comparison of the names to account for both purposeful and accidental mis-spellings of names. It is possible that a person intending to make an illicit transfer will provide a phonetically correct, yet technically incorrect spelling of their name to avoid detection. In this way, if the transfer fails and they are contacted to retrieve the money on the telephone, they will respond properly to the name, even though it is incorrectly spelled. In some embodiments, a combination comparison is utilized where sNameLast 301 and sNameFirst 307 are compared for an exact match with the first and last name fields 510, 515 of a reference designator within reference designator list 500. If an exact name match is not found, a phonetic name comparison is performed by comparing sNameLast 301 and sNameFirst 307 with entries in name fields 510, 515. Alternatively, rNameLast 329 and rNameFirst 333 can be used in various ways for comparison and analysis purposes.

It should be recognized that any number of fields 510, 515, 520, 525, 530, 535 can be used either separate or in combination for comparison purposes. This allows for a number of different specified criteria for evaluating the various money transfer records. Further, it should be recognized that both the sender side of a transaction and the receiver side of the transaction can be analyzed, or in other instances, only the sender side or the receiver side of the transaction is analyzed. Furthermore, it should be recognized that different information from the sender side as compared with the receiver side may be used. For example, both sides of the transaction may be monitored by comparison of sNameLast 301 and sNameFirst 307 with names in reference designator list 500 using both a phonetic and exact comparison method, sPhone 309 with numbers in reference designator list 500, rNameLast 329 and rNameFirst 333 using only an exact match criteria, and rAddress 339 with an address field (not shown) within reference designator list 500.

Figure 8F:
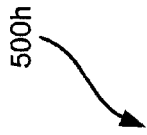

In conjunction with FIGS. 8a-8j, FIG. 7c illustrates one particular embodiment of the present invention where both sPhone 309 and rPhone 337 are compared with phone field 520, sNameLast 301, sNameFirst 307 and rNameLast 329, rNameFirst 333 are compared with name fields 510, 515, first for exact matches and subsequently for phonetic matches. Referring to FIG. 7c, the description proceeds in relation to money transfer record 310 with analysis of the record being reflected in an updated reference designator list 500c as illustrated in FIG. 8a.

First, sPhone 309 and rPhone 337 are compared with phone numbers 570, 575 of reference designator 555 of reference designator list 500a (block 763). As illustrated, neither sPhone 309 nor rPhone 337 matches either numbers 570, 575 associated with reference designator 555 (block 767). Where no match of phone numbers is found, an exact comparison of last names 510 from reference designator 555 is performed with sNameLast 301 and rNameLast 329 of record 310 (block 771). As illustrated, no match of the last names exists and thus a comparison of the first names is not required (block 779). Where an exact name match does not exist, a phonetic comparison of last names 510 from reference designator 555 is performed with sNameLast 301 and rNameLast 329 of record 310 (block 787). As illustrated, a phonetic match of the last names does not exist and thus a comparison of the first names is not required (block 791). Thus, according to the aforementioned embodiment of a search criteria, a relationship does not exist between record 310 and reference designator 555. As reference designator list 500a includes only a single reference designator 555, the process illustrated as block 711 is complete for record 310. However, where more reference designators exist, block 711 is repeated for each reference designator within reference designator list 500. Thus, record 310 would be compared using the aforementioned criteria to compare it with each reference designator within reference designator list 500.

Where no relationship is found between record 310 and any of the reference designators within reference designator list 500, a new reference designator is created and added to the reference designator list (block 731). Referring back to FIG. 7b, record 310 is associated with the newly created reference designator (block 736) and a time stamp 535 is added to the newly created reference designator (block 741). The newly created reference designator is then added to reference designator list 500 (block 746).

FIG. 8a illustrates updated reference designator list 500c including the newly created reference designator, reference designator 810a. Reference designator 810a includes a reference designator number 505, sNameLast 301 and rNameLast 337 from record 310 included in NameLast field 510, sNameFirst 307 and rNameFirst 333 included in NameFirst field 515, sPhone 309 and rPhone 337 included in phone field 520, a master location in created from sAgentNumber 317 as previously described included in MasterLocationIn field 525, a master location out created from rAgentNumber 343 as previously discussed included in MasterLocationOut field 530, and a time stamp defined as sDate 319 included in time stamp field 535.

The indicators (R0) and (R1) are included for illustration with R0 indicating that the included information was part of the initial reference designator list 500a and R1 indicating the included information was added to the reference designator list 500a from record 310. These designators are for convenience in understanding the following development of reference designator list 500 as it is illustrated in FIGS. 8a-8j. The following development includes use of R0-R10 corresponding to the initial reference designator list 500a and information added to the list from records 310, 315, 320, 325, 330, 335, 340, 345, 350.

Again referring to FIG. 7b, after record 310 has been analyzed, it is determined if additional records (e.g., records 315, 320, 325, 330, 335, 340, 345, 355) remain for analysis. As additional records remain for analysis, the next record, record 315, is accessed from money transfer record 400 (block 706) and compared with reference designator list as illustrated in FIG. 7c (block 711). As illustrated by FIG. 8a, sPhone 309 of record 315 matches phone number 850 of reference designator 810a (blocks 763, 767). Having found this match, record 315 is associated with reference designator 810a (block 721). This association is accomplished by adding relevant information from record 315 to reference designator 810a. The updated reference designator 810 is illustrated as reference designator 810b on FIG. 8b. Reference designator 810b includes the sNameLast 301 and sNameFirst 307 from record 315 added to the name fields 510, 515 of reference designator 810b. As shown by the designator (R2) various other elements of record 315 were already represented in reference designator 810b. After record 315 is associated with reference designator 810, Time stamp 535 of reference designator 810 is updated to be sDate 319 of record 315, where sDate 319 is more recent than the previous TimeStamp included with reference designator 810 (block 726). With analysis of record 315 complete, it is determined if an additional record is to be analyzed (block 751).

As records 320, 325, 330, 335, 340, 345, 350, 355 remain for analysis, the next record, record 320, is retrieved from money transfer record 400 (block 706) and compared with reference designator list as illustrated in FIG. 7c (block 711). As illustrated by FIG. 8b, neither of sPhone 309 or rPhone 337 of record 315 matches any of the phone numbers within phone field 520 of either reference designator 555a or reference designator 810b of reference designator list 500d (blocks 763, 767). Further, neither sNameFirst 307 and sNameLast 301 nor rNameFirst 333 and rNameLast 329 matches any of the names within name fields 510, 515 of either reference designator 555a or reference designator 810b (blocks 771, 779). Yet further, a phonetic match of the names does not exist (blocks 787,791). As no matches are identified, it is determined that record 320 is not related to any of the reference designators within reference designator list 500. Thus, a new reference designator is created (block 731) and record 320 is associated with the newly created reference designator (block 736). The newly created reference designator is then added to reference designator list 500 (block 746).

FIG. 8c illustrates updated reference designator list 500 including the newly created reference designator, reference designator 820. Reference designator 820 includes a reference designator number 505, sNameLast 301 and rNameLast 337 from record 320 included in NameLast field 510, sNameFirst 307 and rNameFirst 333 included in NameFirst field 515, sPhone 309 and rPhone 337 included in phone field 520, a master location in created from sAgentNumber 317 as previously described included in MasterLocationIn field 525, a master location out created from rAgentNumber 343 as previously discussed included in MasterLocationOut field 530, and a time stamp defined as sDate 319 included in TimeStamp field 535.

After record 320 has been analyzed it is determined if additional records (e.g., records 325, 330, 335, 340, 345, 355) remain for analysis. As additional records remain for analysis, the next record, record 325, is accessed from money transfer record 400 (block 706) and compared with reference designator list as illustrated in FIG. 7c (block 711). As illustrated by FIG. 8c, sPhone 309 of record 325 matches a phone number of reference designator 810b (blocks 763, 767). Having found this match, record 325 is associated with reference designator 810b (block 721). This association is accomplished by adding relevant information from record 325 to reference designator 810b. The updated reference designator 810 is illustrated as reference designator 810c on FIG. 8d. Reference designator 810b includes the sNameLast 301 and sNameFirst 307 from record 325 added to the name fields 510, 515 of reference designator 810c. Further, because sAgentNumber 317 and rAgentNumber 343 indicate sending and receiving areas different from those already recorded in MasterLocationIn 525 and MasterLocationOut 530, the new locations are added to the respective fields. After record 325 is associated with reference designator 810, Time stamp 535 of reference designator 810 is updated to be sDate 319 of record 325, where sDate 319 is more recent than the previous TimeStamp included with reference designator 810 (block 726). Thus, Time stamp 535 of reference designator 810 changes from Jan. 18, 2002 to Jan. 19, 2002. With analysis of record 325 complete, it is determined if an additional record is to be analyzed (block 751).

As records 330, 335, 340, 345, 350, 355 remain for analysis, the next record, record 330, is retrieved from money transfer record 400 (block 706) and compared with reference designator list as illustrated in FIG. 7c (block 711). As illustrated by FIG. 8d, neither of sPhone 309 or rPhone 337 of record 330 matches any of the phone numbers within phone field 520 of either reference designator 555a, reference designator 810c, or reference designator 820 of reference designator list 500e (blocks 763, 767). Further, neither sNameFirst 307 and sNameLast 301 nor rNameFirst 333 and rNameLast 329 matches any of the names within name fields 510, 515 of any of the reference designators (blocks 771, 779). However, a phonetic match of the sNameLast 301 with last name 855 within NameLast field 510 exists (blocks 787, 791). Having found a phonetic match of last names, a phonetic comparison of first names is then performed (block 787). As sNameFirst 307 from record 330 is a phonetic match with name 856 within NameLast field 515, a complete phonetic match is indicated (block 791) and record 330 is associated with reference designator 810 (block 721).

This association is accomplished by adding relevant information from record 330 to reference designator 810c. The updated reference designator 810 is illustrated as reference designator 810d on FIG. 8e. Reference designator 810d includes the added spelling of sNameLast 301 from 330 added to name field 510 and rNameLast 329 and rNameFirst 333 added to name fields 510, 515 of reference designator 810d. In addition, sPhone 309 and rPhone 337 are added to phone field 520. Further, because sAgentNumber 317 and rAgentNumber 343 indicate sending and receiving areas different from those already recorded in MasterLocationIn 525 and MasterLocationOut 530, the new locations are added to the respective fields. After record 330 is associated with reference designator 810, Time stamp 535 of reference designator 810 is updated (block 726). However, because sDate 319 is the same as the previous Time stamp 535, the update is not completed. With analysis of record 330 complete, it is determined if an additional record is to be analyzed (block 751).

As records 335, 340, 345, 350, 355 remain for analysis, the next record, record 335, is retrieved from money transfer record 400 (block 706) and compared with reference designator list as illustrated in FIG. 7c (block 711). As illustrated by FIG. 8e, neither of sPhone 309 or rPhone 337 of record 335 matches any of the phone numbers within phone field 520 of any of the reference designators of reference designator list 500g (blocks 763, 767). However, sNameFirst 307 and sNameLast 301 matches a name within name fields 510, 515 of reference designator 810d (blocks 771, 779). Thus, a relationship between record 335 and reference designator 810d is indicated. Based on this indication, record 335 is associated with reference designator 810 (block 721).

This association is accomplished by adding relevant information from record 335 to reference designator 810d. The updated reference designator 810 is illustrated as reference designator 810e on FIG. 8f. Reference designator 810e includes added rNameLast 329 and rNameFirst 333 in name fields 510, 515 of reference designator 810e. In addition, sPhone 309 and rPhone 337 are added to phone field 520. Further, because sAgentNumber 317 and rAgentNumber 343 indicate sending and receiving areas different from those already recorded in MasterLocationIn 525 and MasterLocationOut 530, the new locations are added to the respective fields. After record 335 is associated with reference designator 810, Time stamp 535 of reference designator 810 is updated (block 726). However, because sDate 319 is actually earlier than the previous Time stamp 535, the update is not completed. With analysis of record 335 complete, it is determined if an additional record is to be analyzed (block 751).

As records 340, 345, 350, 355 remain for analysis, the next record, record 340, is retrieved from money transfer record 400 (block 706) and compared with reference designator list as illustrated in FIG. 7c (block 711). As illustrated by FIG. 8f, sPhone 309 of record 335 matches a phone number within phone field 520 of reference designator 810f of reference designator list 500h (blocks 763, 767). Based on this indication, record 340 is associated with reference designator 810 (block 721).

This association is accomplished by adding relevant information from record 340 to reference designator 810e. The updated reference designator 810 is illustrated as reference designator 810f on FIG. 8g. Reference designator 810f includes added sNameFirst 307 in name field 515 and added rPhone 337 in phone field 520 of reference designator 810f. Time stamp 535 is not updated as sDate 319 is not more recent than the previous time stamp (block 726). With analysis of record 340 complete, it is determined if an additional record is to be analyzed (block 751).

As records 345, 350, 355 remain for analysis, the next record, record 345, is retrieved from money transfer record 400 (block 706) and compared with reference designator list 500 as illustrated in FIG. 7c (block 711). As illustrated by FIG. 8g, neither of sPhone 309 nor rPhone 337 of record 345 matches any of the phone numbers within phone field 520 of any reference designators of reference designator list 500k (blocks 763, 767). Further, neither sNameFirst 307 and sNameLast 301 nor rNameFirst 333 and rNameLast 329 matches any of the names within name fields 510, 515 of either reference designator 555a, reference designator 810f, or reference designator 820 (blocks 771, 779). However, an exact match of sNameLast 301 with last name 860 within NameLast field 510 exists (blocks 771, 779). Having found an exact match of last names, a phonetic comparison of first names is then performed (block 787). As sNameFirst 307 from record 345 is a phonetic match with name 861 within NameFirst field 515, a complete phonetic match is indicated (block 791) and record 345 is associated with reference designator 555 (block 721).

This association is accomplished by adding relevant information from record 345 to reference designator 555a. The updated reference designator 555 is illustrated as reference designator 555b on FIG. 8h. Reference designator 555b includes added sNameFirst 307 in name field 515 and added sPhone 309 and rPhone 337 in phone field 520 of reference designator 555b. Time stamp 535 is not updated as sDate 319 is not more recent than the previous time stamp (block 726). With analysis of record 345 complete, it is determined if an additional record is to be analyzed (block 751).

As records 350, 355 remain for analysis, the next record, record 350, is retrieved from money transfer record 400 (block 706) and compared with reference designator list 500 as illustrated in FIG. 7c (block 711). As illustrated by FIG. 8h, rPhone 337 of record 350 matches a phone number within phone field 520 of designator 555b (blocks 763,767). Based on this indication, it is determined that record 350 is related to reference designator 555b, thus, record 350 is associated with record designator 555b (block 321).

This association is accomplished by adding relevant information from record 350 to reference designator 555b. The updated reference designator 555 is illustrated as reference designator 555c on FIG. 8i. Reference designator 555c includes added sPhone 309 in phone field 520 of reference designator 555c. Further, a new master location in is added in MasterLocationIn field 525 based on the new sAgentNumber 317. Time stamp 535 is updated to sDate 319 because sDate is more recent than the previous time stamp (block 726). With analysis of record 350 complete, it is determined if an additional record is to be analyzed (block 751).

As record 355 remains for analysis, it is retrieved from money transfer record 400 (block 706) and compared with reference designator list 500 as illustrated in FIG. 7c (block 711). As illustrated by FIG. 8i, sPhone 309 of record 355 matches a phone number within phone field 520 of designator 810f (blocks 763,767). Based on this indication, it is determined that record 355 is related to reference designator 810f, thus, record 355 is associated with record designator 810f (block 721).

This association is accomplished by adding relevant information from record 355 to reference designator 810f. The updated reference designator 810 is illustrated as reference designator 810g on FIG. 8j. Reference designator 810g includes sNameLast 301 and sNameFirst 307 in name fields 510, 515 of reference designator 810g. Further, rPhone 337 is added to phone field 520. Time stamp 535 is not updated as sDate 319 is not more recent than the existing time stamp With analysis of record 355 complete, it is determined if an additional record is to be analyzed (block 751).

As no other records remain for analysis, reference designator list 500 is analyzed to identify reference designators that are associated with suspect money transfer activity (block 756). For example, reference designator 820 may be eliminated from consideration because it represents only a single transfer. Furthermore, as provided by sAmountIn 321 of record 300, sub-record 320, reference designator 820 is associated with a total transfer of only seven hundred, sixty-five Dollars. This is likely to be less than a suspect amount. However, if the single transfer associated with reference designator 820 was more than, for example, five thousand Dollars, reference designator 820 could still indicate a suspect transfer.

In contrast to reference designator 820, reference designator 810 represents a cluster of seven related transactions (e.g. records 310, 315, 325, 330, 335, 340, 355). Such a large cluster of related transactions within a limited time period may be considered suspect. In some embodiments, such a reference designator would be presumptively placed on a high priority consideration list.

Reference designator 555 shows a relationship between three records, records 345, 350 and a prior record (designated (R0)). Minimal inter-relationships as exhibited here may or may not be indicative of suspect activity.

In some embodiments of the present invention, various reference designators from reference designator list 500 are maintained on fraud watch system 210, but not transferred back to money transfer system 100 because they do not warrant further investigation or analysis. For example, reference designators 555, 810 may be transferred back to transaction center 130 for additional analysis, while reference designator 820 is not (block 761). In other embodiments, all reference designators are provided to transaction center 130 for additional analysis (block 761).

Returning to FIG. 7a, reference designator list 500 is provided by fraud watch system 210 to money transfer system 100 (block 740). Reference designator list 500 is used in relation with database management tools to access various money transfer records within transaction database 136 that, based on the reference designators, appear to be suspect (block 745). Using the database management tools and reference designators 555, 810, 820, various indicators associated with a particular reference designator can be investigated. For example, in some embodiments, a reference designator is used to search through transaction database 136 and aggregate the amounts of value transferred across all transactions clustered in association with a particular reference designator. Thus, using reference designator 810 for illustration, it can be determined that the seven transactions associated with reference designator 810 involve a total of twenty thousand, five hundred, ninety-six Dollars over a two day period (aggregate all sAmountIn 321 for the seven transactions). In some cases, this is considered highly suspect warranting additional investigation and/or reporting to the authorities. This process of aggregating transfer amounts can be fine tuned to select a single day transfer amount or a multi-day transfer amount. Furthermore, this process of aggregating can be tuned to select a single day amount in from just senders or amount out provided to receivers. Alternatively, multi-day amounts can be determined for just senders or receivers.

It should be recognized that any number of analysis may be performed in accordance with the present invention using reference designator list 500. Indeed, one of ordinary skill in the art will recognize a myriad of transaction types that can be analyzed based on reference designator list 500. For example, multiple transactions from agent to agent may be provided. Further, all transactions involving a single sender and a single receiver, a single sender and multiple receivers, or multiple senders and a single receiver can be determined. Additionally, a list of known suspect users can be developed by analyzing transaction database 136 using reference designator list 500. Such known suspect users can be designated by name, phone number, address, identification number, agent number, or the like.

The myriad of different reports discussed above can be accessed by selecting a particular report type and printing the associated report (block 750). In some embodiments, software including a variety of user interfaces is provide to allow for easy selection and access to a variety of report types. The software utilizes reference designator 500 to parse through transaction database 136 and generate the desired report. An example of such a user interface is illustrated in FIG. 11.

Figure 11:
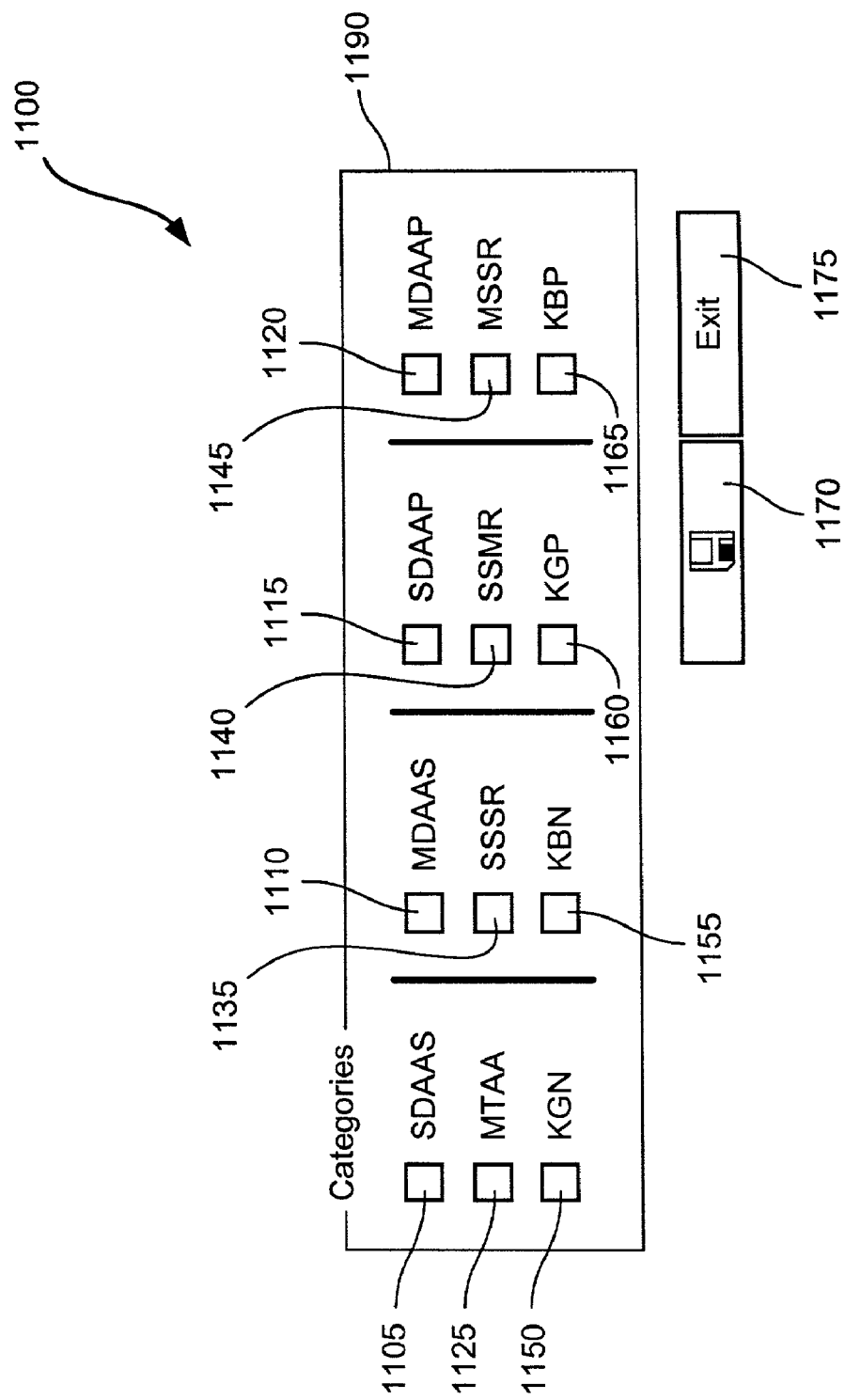
FIG. 11 illustrates a user interface for selecting an analysis criteria in accordance with an embodiment of the present invention.

Referring to FIG. 11, a user interface 1100 includes selection categories 1190 providing a mechanism for selecting a variety of reports. More particularly, selection categories 1190 include a selection for generating a report aggregating the total amount in by a single sender in a single day 1105, a selection for generating a report aggregating the total amount in by a single sender in a multi-day period 1110, a selection for generating a report aggregating the total amount out to a receiver in a single day 1115, a selection for generating a report aggregating the total amount out to a receiver in a multi-day period 1120, a selection for generating a report aggregating the total amount of transactions between two agents 1125, a selection for generating a report aggregating the total amount between a single user and a single receiver 1135, a selection for generating a report aggregating the total amount out between a single sender and multiple receivers 1140, and a selection for generating a report aggregating the total amount transferred between multiple senders and a single receiver 1145.

In addition, selection categories 1190 includes selections for generating a report of known good names 1150 and known bad names 1155. Also, selections for generating a report of known good phone numbers 1160 and known bad phone numbers 1165 are provided. Known good names and numbers can be identify when a reference designator is investigated and, for example, it is determined that the reference designator indicates legitimate commercial activity. Thus, for example, reference designator 555 includes a number of transactions to "Sales Corporation" as indicated by rNameFirst 333 and rNameLast 329 from records 345, 350. This type of activity is commonly clustered and can result in a reference designator associated with a large number of transactions. To avoid continuous investigation of known legitimate senders and receivers, their names can be so identified. Further investigation can be eliminated altogether, or in some cases, only periodically reviewed to consider any change in activity warranting removal from listing as known good users. Similarly, where illegitimate activity is detected, users can be identified as known bad users and investigative activities increased in relation to the known bad user.

At this juncture, it should be recognized that processes discussed in relation to FIGS. 7a-7c can be accomplished by transaction center 130 apart from fraud watch system 210 or by fraud watch system 210 apart from transaction center 130. Alternatively, the processes can be accomplished by any combination of fraud processing center 210 with transaction center 130. Thus, the indications of which processor is performing a certain task merely indicate a single embodiment. One of ordinary skill in the art will recognize a number of possibilities within the scope of the present invention for distributing the various processes discussed in relation to FIGS. 7a-7c between transaction center 130 and fraud watch system 210.

Figure 9A:
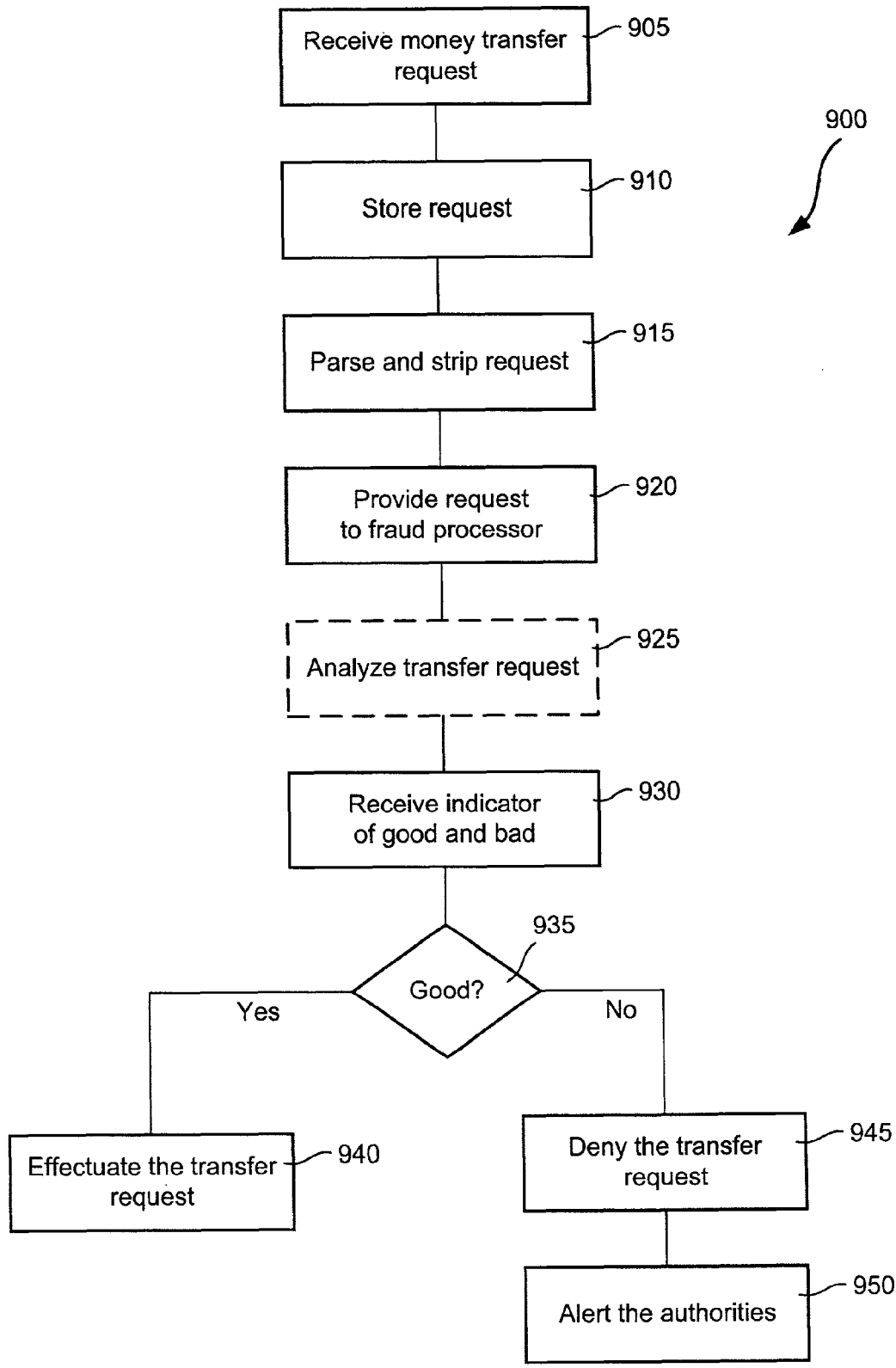
FIGS. 9a-9b illustrate processes associated with monitoring activities on a money transfer system in accordance with another embodiment of the present invention.
Figure 9B:
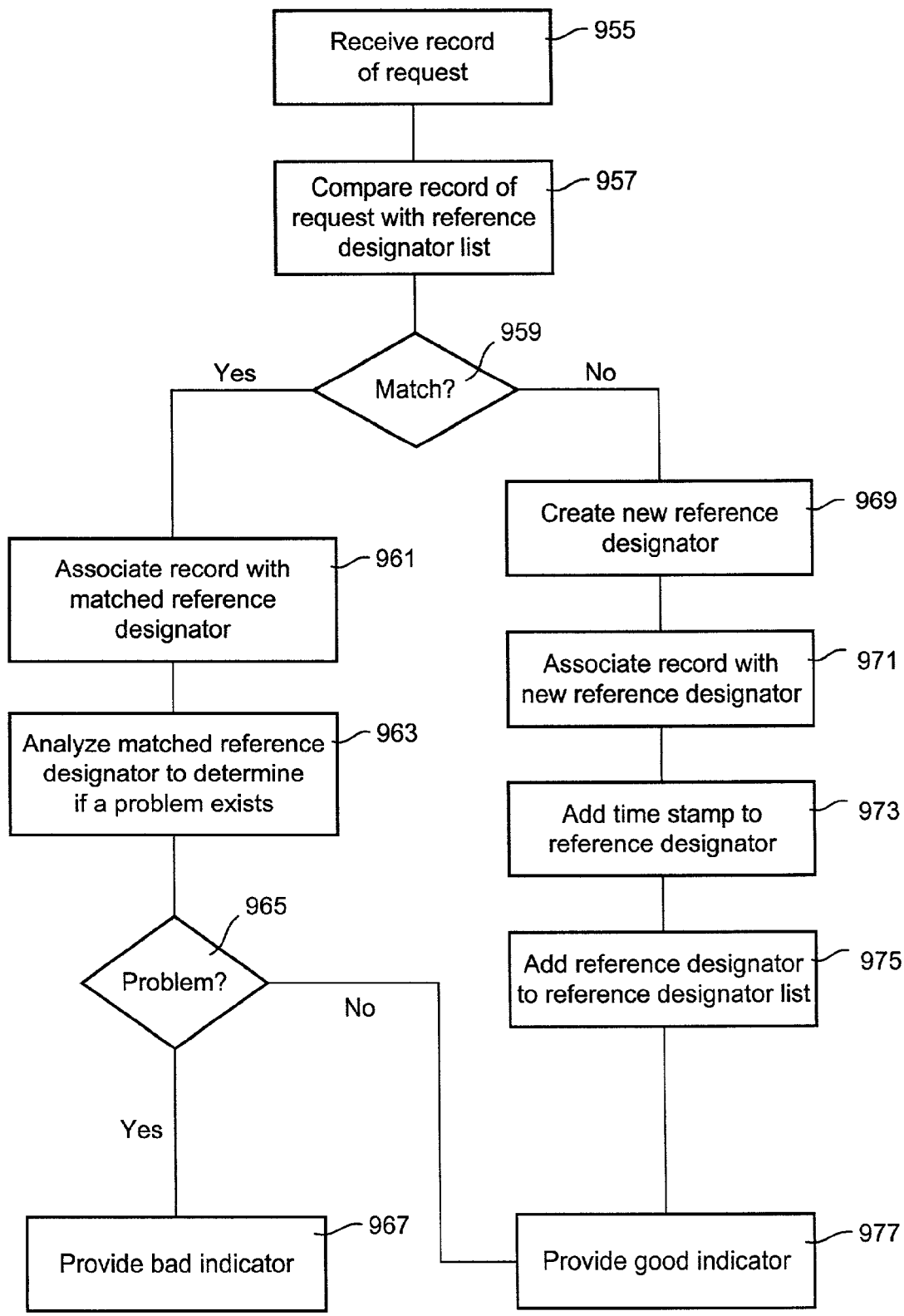

FIGS. 9a-9b illustrates a flow diagram 900 of another embodiment of the present invention where activities of money transfer system 100 are evaluated in real time. Money transfer requests are received by money transfer system 100 (block 905). The received money transfer requests are stored to transaction database 136 (block 910). The stored money transfer request is parsed and stripped of any data that is not relevant to evaluating money transfer system 100 (block 915) and the parsed and stripped record of the money transfer request is provided to fraud watch system 210 (block 920). The individual money transfer request is then analyzed in real time by fraud watch system 210 (block 925).

Referring to FIG. 9b, block 925 is described in detail. The record of the individual money transfer request is received by fraud watch system 210 (block 955) and compared with an existing reference designator list (block 957). It is determined if the record matches any of the reference designators within the reference designator list (block 959).

If the record does not match any reference designator list, a new reference designator is created (block 969) and data from the record under evaluation is associated with the newly created reference designator (block 971). A time stamp is added to the newly created reference designator (block 973) and the reference designator is added to the reference designator list (block 975). Finally, a transaction that does not match any of the reference designators in the reference designator list is presumptively a legitimate transaction and, thus, is identified as a good transaction to money transfer system 100 (block 977). The good indicator is received by money transfer system 100 (block 930), identified as a good indicator (block 935), and the requested transaction is allowed to proceed forward (block 940).

If, on the other hand, the record does match a reference designator on the reference designator list (block 959), the record is associated with the matched reference designator (block 961). The matched reference designator is then analyzed to determine if the reference designator is known to be associated with illegitimate activity, and if so, whether the recently received record is indicative of the known illegitimate activity (block 963). If either the matched reference designator is not associated with known illegitimate activity, or the new record is not identified with known illegitimate activity, no problem is indicated (block 965). In such a situation, a good indicator is provided to money transfer system 100 (block 977) and the transaction is allowed to continue (block 940).

Alternatively, if the matched reference designator is associated with known illegitimate activity and the new record is identified with that activity, a problem is indicated (block 965). Once a problem is indicated (block 965), a bad indicator is provided to money transfer system 100 (block 967). The bad indicator is received by money transfer system 100 (block 930), identified as a bad indicator (block 935), and the requested transaction is denied (block 945). Further, in some embodiments, the authorities are immediately alerted (block 950).

Referring to FIG. 10, an embodiment incorporating multiple fraud watch systems 210 with multiple transaction centers 130 in a compound money transfer system 1000 is illustrated in accordance with an embodiment of the present invention. In such a system, fraud watch system 210a can watch for illegitimate behavior localized to transaction center 130a. Similarly, fraud watch system 210b can watch for illegitimate behavior localized to transaction center 130c. This allows for some activity to be identified at a local level. What activity is not identified at a local level is detected at a higher level by fraud watch system 210c associated with transaction center 130d. It should be recognized that any combination of transaction centers 130 and fraud watch systems 210 can be combined to provide an efficient and accurate evaluation of money transfer system 1000.

The invention has now been described in detail for purposes of clarity and understanding. However, it will be appreciated that certain changes and modifications may be practiced within the scope of the appended claims. For example, other criteria may be used for identifying relationships between reference designators and money transfer records. Additionally, other criteria may be used for analyzing a money transfer database using the reference designators. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for evaluating electronic value transfers, the method comprising:

receiving a plurality of money transfer requests at a host computer system, wherein the money transfer requests include a first sender identification associated with a first money transfer request and at least a second sender identification associated with a second money transfer request;

electronically storing records of the money transfer requests in memory at the host computer system;

performing an analysis of the records at the host computer system wherein the analysis indicates the first sender identification and the second sender identification are related;

creating a reference designator at the host computer system, wherein the reference designator is associated with the first sender identification and the second sender identification, and wherein the reference designator is stored apart from the records of the money transfer requests; and searching the records of the money transfer requests according to a specified criteria to determine if any of the money transfer requests associated with the reference designator are suspicious money transfer requests;

flagging any suspicious money transfer requests at the host computer system;

wherein the first sender identification is selected from a group consisting of a sender name, a sender number, an agent number, a sending data, a sending location, a sender phone number, a sending time, a sending message, and a sending amount; and wherein the suspicious money transfer requests are selected from a group consisting of;

(a) a transfer from a first sender to a second sender followed within a specified period by a transfer from the second sender to the first sender;

(b) a group of transfers from a sender to a group of receivers, wherein the aggregate amount of the group of transfers exceeds a specified level;

(c) one or more transfers from a sender to a receiver, wherein the aggregate amount of the one or more transfers exceeds a specified level;

(d) a group of transfers from a group of senders to a receiver, wherein the aggregate amount of the group of transfers exceeds a specified level;

(e) two transfers from a first sender to a second sender that are followed within a specified period by corresponding transfers from the second sender to a receiver;

(f) two or more transfers from a sender to a receiver, wherein the two or more transfers are initiated from two or more distinct locations within a region; and (g) two or more transfers from a sender to a receiver, wherein the two or more transfers are received at two or more distinct locations within a region.

2. The method of claim 1, wherein the analysis comprises:
a hierarchical comparison of the first sender identification with the second sender identification.

3. The method of claim 2, wherein the hierarchical comparison comprises the sequential process:
(1) comparing a phone number in the first sender identification with a phone number in the second sender identification;
(2) comparing an exact name in the first sender identification with an exact name in the second sender identification; and
(3) comparing a phonetic name in the first sender identification with a phonetic name in the second sender identification.

4. The method of claim 2, wherein the analysis further comprises:
an iterative learning of a reliable factor for identifying suspicious money transfer requests; and
updating the hierarchical comparison to incorporate the reliable factor.

5. The method of claim 1, wherein the flagging any suspicious money transfer requests comprises identifying the reference designator as a known suspicious user, the method further comprising:
searching the records to determine if any of the money transfer requests are either initiated or received by the known suspicious user.

6. The method of claim 5, wherein the searching is done in real-time and wherein the known suspicious user is identified in real-time.

7. The method of claim 1, wherein the flagging any suspicious money transfer requests comprises identifying the reference designator as a known suspicious user, the method further comprising:
determining that transfers of a known suspicious user are legitimate, and identifying the known suspicious user as a known legitimate user, wherein monitoring of money transfers associated with the known legitimate user are reduced.

8. The method of claim 1, the method further comprising:
parsing the money transfer requests, wherein the records of the money transfer requests are stripped of data that is not necessary to detecting suspicious money transfers.

9. The method of claim 1, wherein a first receiver identification is associated with the first money transfer request and a second receiver identification is associated with the second money transfer request, and wherein the analysis utilizes:
at least one of the first and second sender identifications; and
at least one of the first and second receiver identifications.

10. The method of claim 9, wherein the first receiver identification is selected from a group consisting of a receiver name, a receiver number, an agent number, a receiver data, a receiving location, a receiver phone number, a receiving time, a receiver language, a receiver message, and a receiving amount.

11. The method of claim 9, wherein the reference designator is further associated with one or both of the first receiver identification and the second receiver identification.

12. The method of claim 1, wherein the reference designator is maintained on a first database and the records are maintained on a second database, whereby a performance impact of the method upon a money transfer system under evaluation is reduced.

13. The method of claim 12, wherein the searching the records is done in a batch mode at an off-peak time for the money transfer system.

14. A method for evaluating electronic value transfers, the method comprising:
accessing a money transfer record at fraud processing computer, wherein the money transfer record includes a sender identification and a receiver identification;
assigning a master location identifier to the money transfer record at the fraud processing computer, wherein the master location identifier is determined by one or both of the sender identification and the receiver identification;
comparing the money transfer record to a reference designator using a specified criteria at the fraud processing computer, wherein one or more fields of the reference designator or the money transfer record indicate a relationship between the reference designator and the money transfer record; and
associating the money transfer record with the reference designator at the fraud processing computer.

15. A method for iteratively compiling suspicious money transfer activities from money transfer records, the method comprising:
accessing a first money transfer record at a fraud processing computer;
providing a first reference designator at the fraud processing computer, wherein the first reference designator is associated with one or more of a sender identification and a receiver identification from a second money transfer record;
comparing the first money transfer record to the first reference designator using a specified criteria at the fraud processing computer, wherein the comparison indicates the first money transfer record is not related to the first reference designator; and
creating a second reference designator at the fraud processing computer, wherein the second reference designator is associated with one or more of a sender identification and a receiver identification from the first money transfer record; and
maintaining the first and second reference designators in a reference designator list apart from the first and second money transfer records, wherein a performance impact of the method upon a money transfer system under evaluation is reduced, analyzing the reference designator list for suspicious money transfer activities at the fraud processing computer;
wherein the suspicious money transfer activities are selected from a group consisting of:
(a) a transfer from a first sender to a second sender followed within a specified period by a transfer from the second sender to the first sender;
(b) a group of transfers from a sender to a group of receivers, wherein the aggregate amount of the group of transfers exceeds a specified level;
(c) one or more transfers from a sender to a receiver, wherein the aggregate amount of the one or more transfers exceeds a specified level;

(d) a group of transfers from a group of senders to a receiver, wherein the aggregate amount of the group of transfers exceeds a specified level;
(e) two transfers from a first sender to a second sender that are followed within a specified period by corresponding transfers from the second sender to a receiver;
(f) two or more transfers from a sender to a receiver, wherein the two or more transfers are initiated from two or more distinct locations within a region; and
(g) two or more transfers from a sender to a receiver, wherein the two or more transfers are received at two or more distinct locations within a region; and flagging any suspicious money transfer activities.

16. The method of claim 15, the method further comprising:
accessing a third money transfer record;
comparing the third money transfer record to the first reference designator using the specified criteria, wherein one or more fields of the first reference designator or the third money transfer record indicate a relationship between the first reference designator and the third money transfer record; and
associating the third money transfer record with the first reference designator.

17. The method of claim 15, the method further comprising:
attaching a time stamp to the second reference designator, wherein the second reference designator expires at a future time associated with the time stamp.

18. The method of claim 15, wherein the reference designator list is a progressive history of money transfer relationships.

19. The method of claim 15, wherein the specified criteria comprises a hierarchical comparison.

20. A method for evaluating electronic value transfers, the method comprising:
receiving money transfer requests at a computer, wherein the money transfer requests include a user identification associated with each of the money transfer requests, and wherein the money transfer requests have been grouped based on similarities between the user identifications;
electronically storing records of the money transfer requests at the computer;
providing the records of the money transfer requests to a fraud processing computer; and
receiving an indication of a suspicious money transfer request at the computer, wherein:
the suspicious money transfer request was flagged as suspicious; and
the indication includes the user identification associated with the suspicious money transfer request;
wherein the suspicious money transfer request is selected from a group consisting of:
(a) a transfer from a first sender to a second sender followed within a specified period by a transfer from the second sender to the first sender;
(b) a group of transfers from a sender to a group of receivers, wherein the aggregate amount of the group of transfers exceeds a specified level;
(c) one or more transfers from a sender to a receiver, wherein the aggregate amount of the one or more transfers exceeds a specified level;
(d) a group of transfers from a group of senders to a receiver, wherein the aggregate amount of the group of transfers exceeds a specified level;
(e) two transfers from a first sender to a second sender that are followed within a specified period by corresponding transfers from the second sender to a receiver;
(f) two or more transfers from a sender to a receiver, wherein the two or more transfers are initiated from two or more distinct locations within a region; and
(g) two or more transfers from a sender to a receiver, wherein the two or more transfers are received at two or more distinct locations within a region.

21. A system for evaluating value transfers, the system comprising:
a fraud processing computer; and
a non-transitory computer readable medium associated with the fraud processing computer, wherein the non-transitory computer readable medium comprises computer instructions which when executed by the fraud processing computer cause the said fraud processing computer to:
access a first money transfer record;
provide a first reference designator, wherein the first reference designator is associated with one or more of a sender identification and a receiver identification from a second money transfer record;
compare the first money transfer record to the first reference designator using a specified criteria, wherein the comparison indicates the first money transfer record is not related to the first reference designator; and
create a second reference designator, wherein the second reference designator is associated with one or more of a sender identification and a receiver identification from the first money transfer record;
search money transfer records according to a specified criteria to determine if any of the money transfer records associated with the first reference designator, the second reference designator, or both are suspicious money transfer records;
flag any suspicious money transfer records; and
maintain the first and second reference designators in a reference designator list apart from the first and second money transfer records, wherein a performance impact of the method upon a money transfer system under evaluation is reduced.

22. The system of claim 21, wherein the computer instructions are further executable by the fraud processing computer to:
access a third money transfer record;
compare the third money transfer record to the first reference designator using a specified criteria, wherein one or more fields of the first reference designator or the third money transfer record indicate a relationship between the first reference designator and the third money transfer record; and
associate the third money transfer record with the first reference designator.

23. The system of claim 22, the system further comprising:
a database associated with the fraud processing computer, wherein the first and the second reference designators are maintained on the database.

* * * * *

UNITED STATES PATENT AND TRADEMARK OFFICE
CERTIFICATE OF CORRECTION

| | | |
|---|---|---|
| PATENT NO. | : 8,412,633 B2 | Page 1 of 1 |
| APPLICATION NO. | : 10/091000 | |
| DATED | : April 2, 2013 | |
| INVENTOR(S) | : Degen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 3027 days.

Signed and Sealed this
Twenty-third Day of September, 2014

Michelle K. Lee
*Deputy Director of the United States Patent and Trademark Office*